(12) United States Patent
Girdzis

(10) Patent No.: US 10,554,033 B2
(45) Date of Patent: Feb. 4, 2020

(54) UNDER CABINET MOBILE BROADBAND DEVICE CHARGING AND USE SYSTEM

(71) Applicant: Timothy J. Girdzis, Manchester, VT (US)

(72) Inventor: Timothy J. Girdzis, Manchester, VT (US)

(*) Notice: Subject to any disclaimer, the term of this patent is extended or adjusted under 35 U.S.C. 154(b) by 0 days.

(21) Appl. No.: 15/812,678

(22) Filed: Nov. 14, 2017

(65) Prior Publication Data

US 2018/0138683 A1    May 17, 2018

Related U.S. Application Data

(60) Provisional application No. 62/603,266, filed on May 22, 2017, provisional application No. 62/497,261, filed on Nov. 14, 2016.

(51) Int. Cl.
| | |
|---|---|
| *H02G 11/02* | (2006.01) |
| *H02J 7/00* | (2006.01) |
| *A47B 46/00* | (2006.01) |
| *A47B 88/48* | (2017.01) |
| *A47B 96/02* | (2006.01) |
| *A47B 77/02* | (2006.01) |
| *A47B 77/08* | (2006.01) |
| *H02J 7/02* | (2016.01) |

(52) U.S. Cl.
CPC .......... *H02G 11/02* (2013.01); *A47B 46/005* (2013.01); *A47B 88/48* (2017.01); *A47B 96/025* (2013.01); *H02J 7/0044* (2013.01); *H02J 7/0052* (2013.01); *A47B 77/02* (2013.01); *A47B 77/08* (2013.01); *A47B 2200/0083* (2013.01); *H02J 7/025* (2013.01); *H02J 2007/0062* (2013.01)

(58) Field of Classification Search
CPC ...... H02G 11/02; H02J 7/0044; H02J 7/0052; H02J 2007/0062; H02J 7/025; A47B 96/025; A47B 46/005; A47B 88/48; A47B 2200/0083; A47B 77/02; A47B 77/08
USPC .......................................................... 320/108
See application file for complete search history.

(56) References Cited

U.S. PATENT DOCUMENTS

| | | | | |
|---|---|---|---|---|
| 5,634,604 | A * | 6/1997 | Cooper ............... | B65H 57/20 242/128 |
| 5,749,148 | A * | 5/1998 | White, III .......... | A01D 34/416 30/276 |
| 5,975,120 | A * | 11/1999 | Novosel ........... | A61M 16/0666 137/355.23 |
| 6,466,121 | B1 * | 10/2002 | Moreno ................ | H01F 5/04 336/192 |

(Continued)

OTHER PUBLICATIONS

Ergotron Ergonomics Data sheet (revision Apr. 1, 2014).

*Primary Examiner* — M Baye Diao
(74) *Attorney, Agent, or Firm* — Bassett IP Strategie; David F. Bassett

(57) ABSTRACT

The present invention provides a system for the charging and use of mobile broadband devices, keeping the devices visually accessible while avoiding infringement of useful space. A user of the system has full operation of their mobile broadband devices where under cabinet mounted. The present invention makes use of a rewind assembly for the organization and use of the charging cable for mobile broadband devices which provides for a winding of the charging cable onto an automatic rewind.

22 Claims, 36 Drawing Sheets

(56) References Cited

U.S. PATENT DOCUMENTS

| | | | |
|---|---|---|---|
| 7,303,202 B1* | 12/2007 | Tucker | B62M 1/16 |
| | | | 280/242.1 |
| 7,868,250 B2* | 1/2011 | Kolada | H01R 13/60 |
| | | | 174/135 |
| 2005/0076515 A1* | 4/2005 | Proulx | A01D 34/4163 |
| | | | 30/276 |
| 2008/0170355 A1 | 7/2008 | Kyriakides et al. | |
| 2015/0070867 A1 | 3/2015 | Head | |
| 2017/0013343 A1* | 1/2017 | Tomlinson | B65H 75/4431 |

* cited by examiner

UNDER CABINET MOBILE BROADBAND DEVICE CHARGING AND USE SYSTEM

CROSS-REFERENCE TO RELATED PATENT APPLICATIONS

Priority for this patent application is based upon provisional patent application 62/497,261 (filed on Nov. 14, 2016) and provisional patent application 62/603,266 (filed on May 22, 2017). The disclosure of these United States patent applications is hereby incorporated by reference into this specification.

FIELD OF THE INVENTION

The present invention relates to an organizational system for the routine use of mobile broadband devices wherein they may be charging while fully visually and audibly accessible in a dedicated non-invasive space.

BACKGROUND OF THE INVENTION

Mobile broadband devices, including smartphones, tablets, personal data assistants (PDAs), and the like are ubiquitous in modern society. The broad introduction of a myriad of applications has created a reliance by the device users to remain virtually connected to the internet. Much of this reliance is satisfied visually by the users of these devices, thereby creating the need for constant visual contact with the user devices screens. As the users desire to maintain the most satisfactory connectivity to the internet and other data sources, the optimum solution requires full time accessibility. This requires the devices to be within reach, which naturally means competition with other items for the same space.

This has created a need for a system to provide visual accessibility to mobile broadband devices while remaining non-intrusive in the space. To attain these high levels of accessibility, the frequent charging required by these devices must be incorporated into the system. Of significant concern is the need for cord management. Because the system by its nature is visually accessible, organization and aesthetic value require strong consideration. This includes the elimination of unsightly and unwieldly cords, and safety concerns.

Systems for charging and storing mobile electronic devices are available in the current art. While these systems do provide for keeping the cords from untangling while charging the device and may provide easy storage, they do still leave several user needs unmet.

An apparatus such as that described in U.S. Pat. No. 7,868,250 (power supply and cord management apparatus for electronic devices) provides a surface for placing electronic devices while charging and a bracket upon which to manually wind a device cord. However, it does not allow for easy cord extension and retraction for the user of the device. For example, the user could not pick up and use a smartphone that requires charging without either carrying the entire shelf or unplugging the smartphone which could cease its operation.

It is an object of the present invention to overcome this limitation by allowing for the device charging cord to readily wind and unwind during the normal course of operation, thereby allowing continuous charging during use and keeping the cord from tangling.

Additionally, others have created systems for electronic devices to be placed in drawers or carrying cases, e.g., U.S. patent application Ser. No. 11/653,460 (container for multiple household electronic charging compartment). While this carrying case could be placed on a countertop, there would be no apparent reduction of countertop clutter as it represents a redirection of the countertop's use. The present invention overcomes this countertop cluttering by maintaining the devices charging while fully visually accessible in a dedicated non-invasive space.

Others have tried to overcome the aesthetics issues by building drawers into items of furniture such as desks or night stands e.g., U.S. patent application Ser. No. 14/478,495 (media drawer). This solution requires the charging to occur in an invasive space requiring the inclusion of a piece of furniture. The visual accessibility to the mobile broadband devices is restricted by the type and design of the furniture. The aesthetics of the charging cords are controlled by the closing of the media drawer front. The present invention does not face these limitations.

The same issue of keeping cords organized and compact is present for other materials. It will be demonstrated that the cable rewind assembly may be used with a plethora of materials with similar properties wherein an object with coilability such as wire, cable, hosing, rope, and the like needs to be readily and easily deployed and retracted to varying lengths while in use.

SUMMARY OF THE INVENTION

The object of the present invention is to provide a system for the charging and use of mobile broadband devices, including smartphones, tablets, personal data assistants (PDAs), and the like, keeping the devices readily accessible while avoiding infringement of useful space. A user of the system has full operation of their mobile broadband devices where under cabinet mounted. In one preferred embodiment of the present invention, the system is installed to the underside of an upper kitchen cabinet. The user can place the mobile broadband device on an adjustable shelf assembly and, while the device is charging or is fully charged, maintain access to the device's full functionality. The under cabinet mobile broadband device charging and use system may be sized for accommodating a plurality of broadband devices, which can be charged either singularly or more than one at a time.

Referring to FIGS. 1A and 1B, an under cabinet mobile broadband device charging and use system 100 is depicted. The details of how to make and use the invention will be provided later in this specification. The invention provides several advantages over systems available in the prior art. The system because of its mounting to the underside of cabinets, shelving, and the like occupies no space on the surfaces below such as countertops and desktops. For rooms where space is a premium, this is a major advantage. The system may also easily be installed and then removed and relocated so as the décor and needs/uses of a room change, the system may readily accommodate these changes.

Additional advantages include the system's low profile captivated adjustable charging shelf which when the system is not in use is not visible from standard viewing angles when under cabinet or similar mounting. The system is adjustable both horizontally and angularly to allow a user to view and use the device from a comfortable ergonomically friendly viewing angle when the system is deployed. The system allows for device use while charging and keeps all cords for the devices untangled and out of view of the user, save for a single power cord that would typically be connected to a standard power outlet receptacle. (This power cord may also be optionally removed from the user view as well.) This ability to easily, conveniently, and intuitively keep power cords untangled and out of view is a significant improvement over the other devices of the current art.

The system further accommodates multiple devices including different types of devices such as phones and tablets which may have differing dimensions (thickness, width, and height).

The system may be configured for use with inductive charging pads or the like which allow a user to simply place a device on the inductive charging pad for charging the device while the device is in use.

The system may alternatively be configured to use a charging bar outfitted with angularly adjustable tips to allow a user to adjust the tip to a convenient angle and then attach their mobile broadband device to the tip. As the device is placed in the system the tip adjusts to allow the device to rest on an upper shelf of the system providing convenient visual access to the device screen.

The rewind assembly used in the system for the organization and use of the charging cable for mobile broadband devices, including smartphones, tablets, PDAs, and the like provides for a winding of the charging cable onto an automatic rewind. It can be arranged to have a mobile broadband device connector emanating from its center in either a horizontal or vertical alignment or from an outer edge. Once wound, a user can connect between a charging power source and the mobile broadband device. The user can unwind and lock the length of the charging cable for connection to the mobile broadband device and, while it is charging, maintain access to the devices full functionality.

The rewind assembly will be demonstrated to have uses beyond the under cabinet mobile broadband device charging and use system. One mode of use is connecting to a power source in a dedicated space such as a kitchen counter or office desk. Another mode of use is connecting headphones for listening to a device such as a smartphone or MP3 player.

The rewind assembly has several unique advantages over those currently in use including the ability to load with proprietary charging cables of any length, including cables with device specific connectors. For example, it can incorporate a commonly used connector on one end, such as USB Type-A, and a device specific connector on the other end, such as an Apple MD818AM/A Lightning to USB cable available at amazon.com.

Another advantage of the rewind assembly is its extension and retraction is on one side only, so it can remain at a fixed location, such as a clothing pocket. This allows for length control when locked to reduce the possibility of tangling.

This rewind assembly may be used with any mobile device, broadband or otherwise, and me be used in a dedicated or mobile location as well. The rewind assembly may further be used for the rewind of cables and other materials with a coilability such as hose, chain, wire, tubing, and the like for use other than charging mobile broadband devices.

BRIEF DESCRIPTION OF THE DRAWINGS

Embodiments of the present invention will be described by reference to the following drawings, in which like numerals refer to like elements, and in which.

LIST of PARTS

Figure 1A:
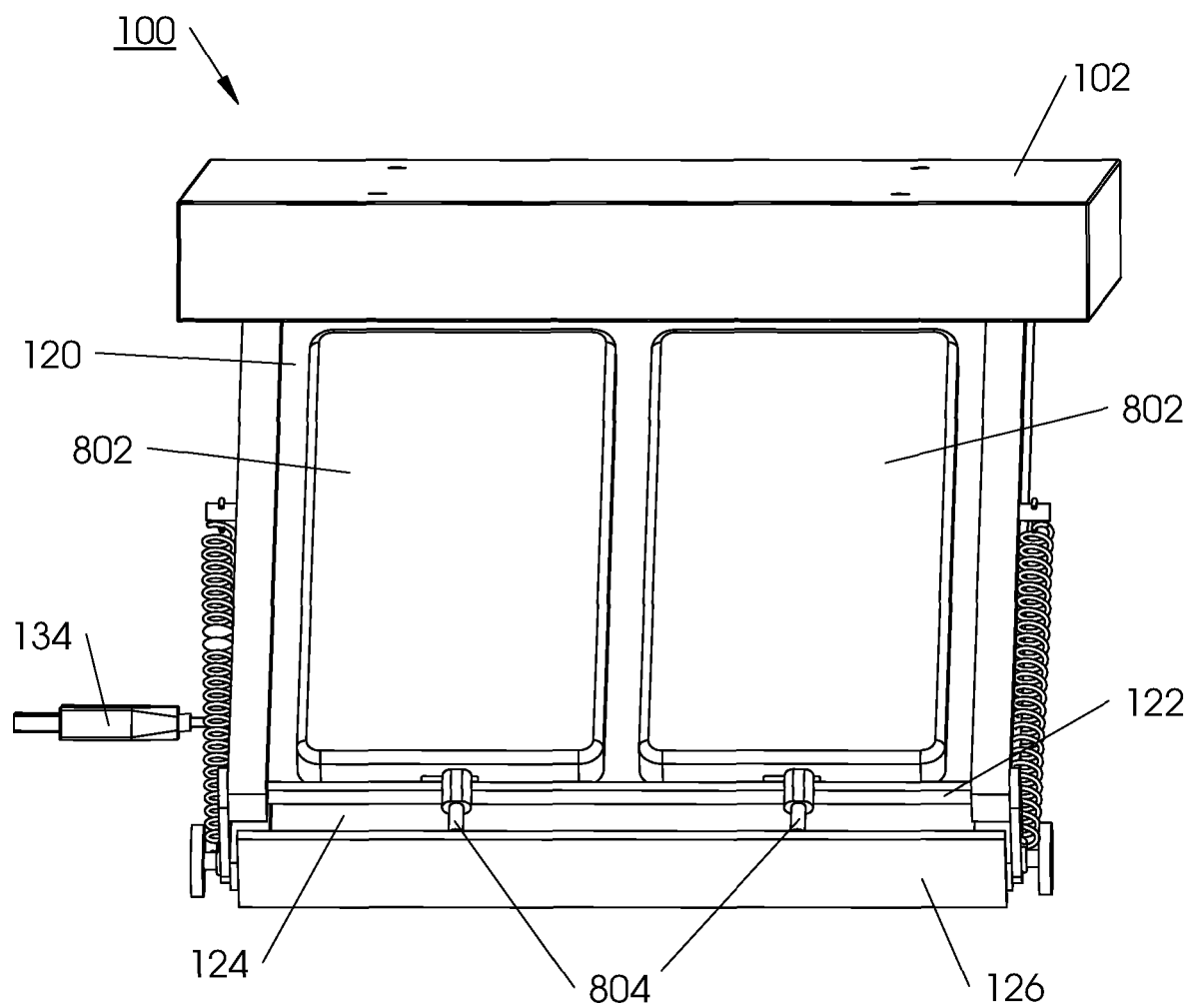
FIG. 1A is an elevation view of the front illustrating the charging and use system according to the invention in operation, and showing its general features.

The following is a listing of parts presented in the drawings:
100—under cabinet mobile broadband device charging and use system;
102—system housing;
104—mounting holes;
106—sleeve bearing guide rail;
108—sleeve bearing carriage;
110—carriage spacer;
112—support arm;
114—knob;
116—spring;
118—support arm pivot bracket;
120—upper shelf;
122—upper shelf front;
124—lower shelf;
126—lower shelf front;
128—power supply distribution block;
132—rewind pin;
134—system power cable rewind;
136—plunger locating hole;
200—under cabinet mobile broadband device charging and use system;
202—system housing;
204—mounting holes;
206—sleeve bearing guide rail;
208—sleeve bearing carriage;
210—carriage spacer;
212—support arm;
214—knob;
216—spring;
218—support arm pivot bracket;
220—upper shelf;
222—upper shelf front;
224—lower shelf;
226—lower shelf front;
228—power supply distribution block;
234—system power cable rewind;
252—wireless charger;
254—wireless charger cable;
256—tee shaped slot (t-slotted) long extrusion slide;
258—tee shaped slot (t-slotted) short extrusion slide;
260—tee shaped (t-slotted) extrusion locator;
300—under cabinet mobile broadband device charging and use system;
302—system housing;
304—mounting holes;
306—sleeve bearing guide rail;
308—sleeve bearing carriage;
310—carriage spacer;
312—support arm;
314—knob;
316—spring;
318—support arm pivot bracket;
320—upper shelf;
322—upper shelf front;
324—lower shelf;
326—lower shelf front;
328—power supply distribution block;
334—system power cable rewind;
382—charging bar;
384—USB to USB cable;
386—removable/pivoting tip;
400—mobile broadband device charging and use system, (also referred to as rewind assembly);
402—upper spool flange;
404—upper grommet;
406—charging cable half spool;
408—charging cable spool pivoting section;
410—middle spool flange;
412—rewind spring housing/ratchet wheel;
414—spring steel rewind;
416—wave disc spring;
418—rewind string;
420—string spool;
422—lower grommet;
424—lower spool flange;
426—plunger;
428—pawl;
430—torsion spring;
432—pawl mount;
434—star wheel;
436—string pull;
438—USB receptacle;
440—USB cable;
500—mobile broadband device charging and use system, (also referred to as rewind assembly);

502—upper spool slotted flange;
504—upper slotted grommet;
506—charging cable full spool;
510—middle spool flange;
512—rewind spring housing/ratchet wheel;
514—spring steel rewind;
516—wave disc spring;
518—rewind string;
520—string spool;
522—lower grommet;
524—lower spool flange;
526—plunger;
528—pawl;
530—torsion spring;
532—pawl mount;
534—star wheel;
536—string pull;
600—mobile broadband device charging and use system, (also referred to as rewind assembly);
602—upper spool flange;
604—upper grommet;
606—charging cable half spool;
608—charging cable spool pivoting section;
610—middle spool flange;
612—rewind spring housing/ratchet wheel;
614—spring steel rewind;
616—wave disc spring;
618—rewind string;
620—string spool;
622—lower grommet;
624—lower spool flange;
626—plunger;
628—pawl;
630—torsion spring;
632—pawl mount;
634—star wheel;
636—string pull;
638—USB receptacle;
640—USB cable;
700—under cabinet mobile broadband device charging and use system;
702—system housing;
802—mobile broadband device;
804—mobile broadband device charging cable;
806—large mobile broadband device;
808—receptacle;
810—kitchen countertop;
812—lower kitchen cabinet;
814—upper kitchen cabinet;
816—power supply distribution block;
818—wall charger;
902—user; and
904—user.

DETAILED DESCRIPTION OF THE INVENTION

The present invention relates to an organizational system for the routine use of mobile broadband devices wherein they may be charging while fully visually accessible in a dedicated non-invasive space.

FIG. 1A is an elevation view illustrating the front assembly of a preferred under cabinet mobile broadband device charging and use system 100 (charging and use system 100) according to the invention in operation. A system housing 102 provides the structure for the assembly. Though the system housing 102 depicted in FIG. 1A shows a front portion to the housing, creating a box, the system housing may be constructed without the front portion of the system housing. The assembly includes an upper shelf 120 with an upper shelf front 122, and a lower shelf 124 with a lower shelf front 126. Two mobile broadband devices 802 are depicted charging through the mobile broadband device charging cables 804. The charging and use system 100 is powered through a system power cable rewind 134 which may be connected to premise wiring or other power source directly through the cable or through a device such as a wall charger 818. The system power rewind 134 is a cable rewind that has a fixed length cable inlet with a USB connector, and a rewinding cable outlet with a USB connector. The system power rewind 134 mounts to the underside of the system housing 102. The fixed length USB cable connects the system power rewind 134 to a wall charger 818, which plugs into a receptacle 808. The rewinding USB cable supplies DC voltage to a power supply distribution block 128. As the user of the charging and use system 100 slides the upper shelf 120 and lower shelf 124, which are mounted on the sleeve bearing carriage 108, along the sleeve bearing guide rail 106, the system power cable rewind 134 maintains tension on the cable to the power supply distribution block 128.

Figure 1B:
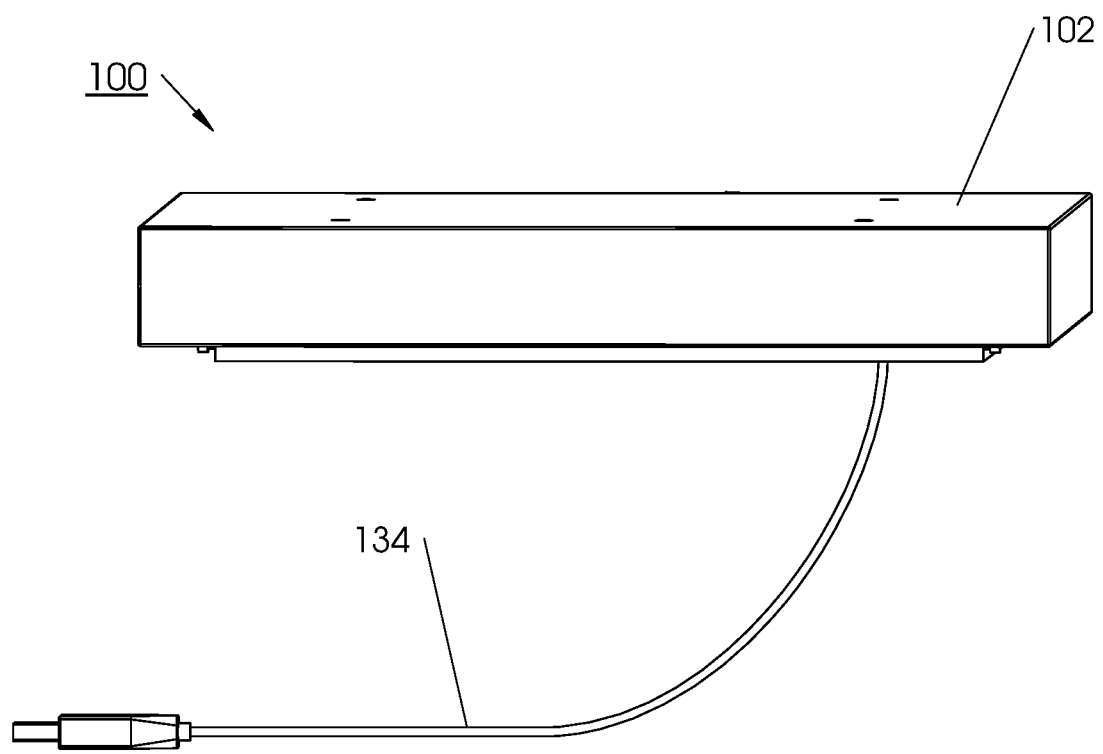
FIG. 1B is an elevation view of the front illustrating the charging and use system of FIG. 1A in a retracted position.

FIG. 1B is an elevation view illustrating the front of the preferred under cabinet mobile broadband charging and use system 100 in a retracted position. Once retracted, the system housing 102 contains the entire assembly, with the system power cable rewind 134 remaining available for connection to premise wiring.

Figure 2A:
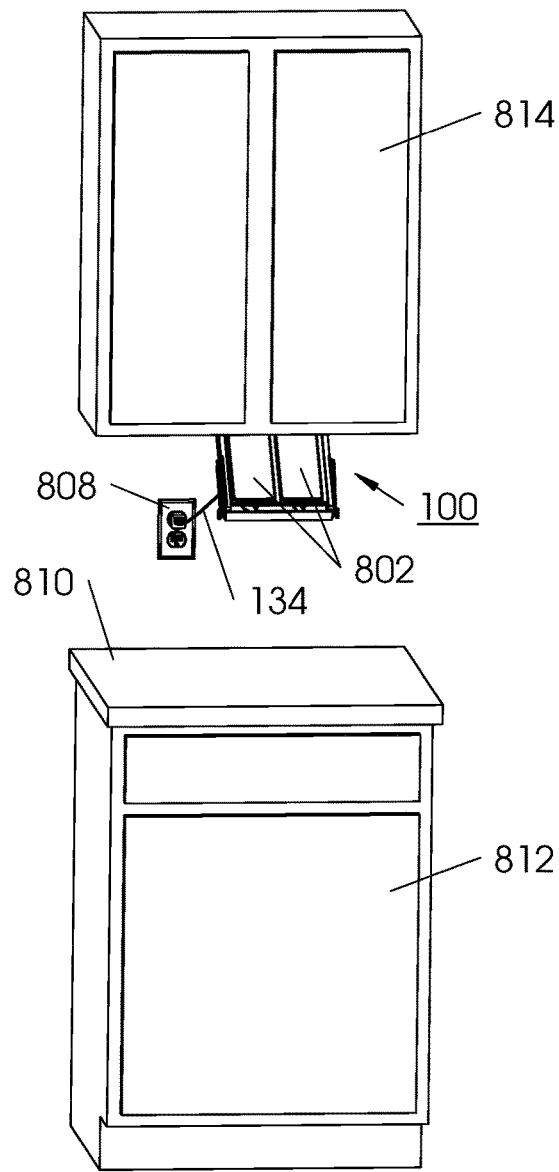
FIG. 2A is an environmental perspective view illustrating the charging and use system of FIG. 1A according to its use in kitchen operation, and showing its general features.

FIG. 2A depicts an environmental perspective view illustrating the under cabinet mobile broadband charging and use system 100 according to its use attached to the underside of a standard upper kitchen cabinet 814 above a lower kitchen cabinet 812 in kitchen operation with two mobile broadband devices 802. This system may be attached to the lower surface of any shelving such as a cabinet, bookcase, weight rack, credenza, spice rack, coffee pod rack, conventional cookbook stand, music stand, or the like as would be found in a kitchen, laundry room, exercise room, college dorm room, office, or the like. As depicted the system housing 102 is mounted to the underside of a standard upper kitchen cabinet 814. The charging and use system 100 is powered through the system power cable rewind 134 which is connected to premise wiring through a receptacle 808. As is readily discernable, the charging and use system 100 is located above the countertop 810 of said lower kitchen cabinet 812 and the countertop 810 is free for other uses while the charging and use system 100 is in use.

Figure 2B:
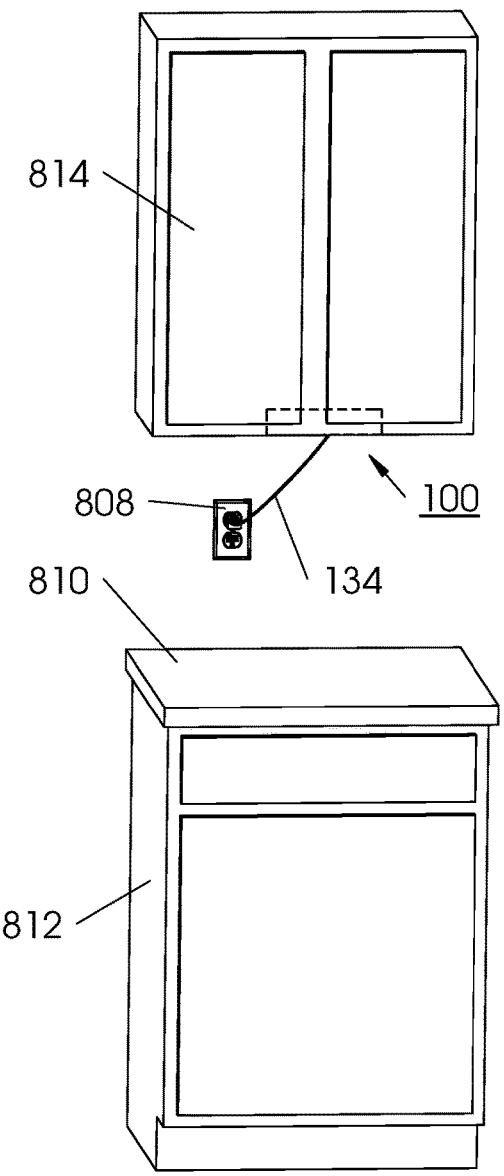
FIG. 2B is an environmental perspective view illustrating the charging and use system of FIG. 1A according to its use in kitchen operation in a retracted position.
Figure 2C:
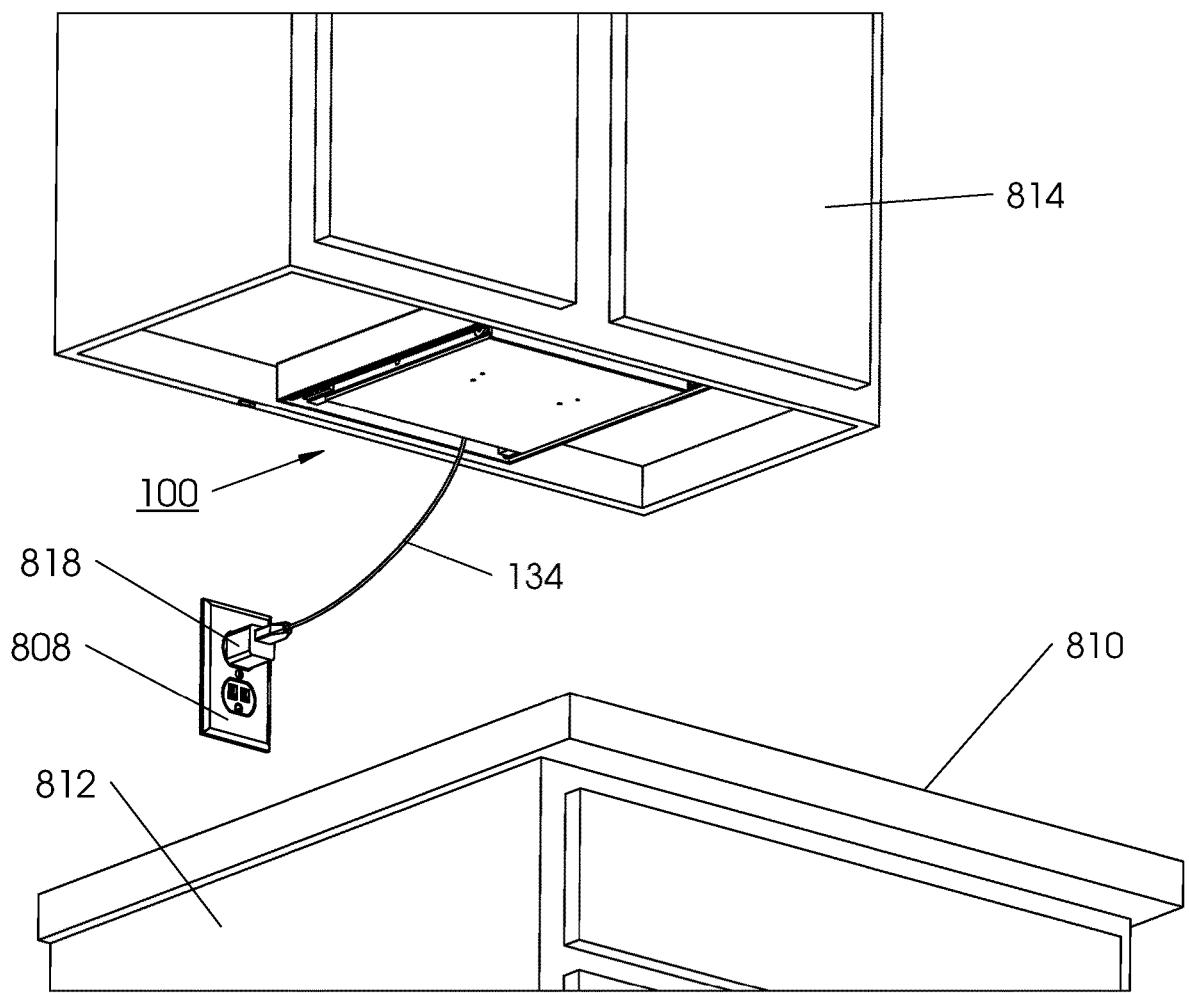
FIG. 2C is an environmental perspective view illustrating the charging and use system of FIG. 1A according to its use in kitchen operation from below countertop level illustrating the charging and use system in a retracted position.

FIGS. 2B and 2C provide environmental perspective views illustrating the under cabinet mobile broadband charging and use system 100 according to its use in kitchen operation in a retracted position. Once retracted, visibility of the under cabinet mobile broadband charging and use system 100 when mounted to the underside of the standard upper kitchen cabinet 814, is limited to the system power cable rewind 134 which is connected to receptacle 808, which as depicted is a standard 120 volt 60 Hertz receptacle, via the wall charger 818. As is readily apparent to those skilled in the art, the charging and use system 100 could be connected to any power system by using an appropriate wall charger which is readily available in the current art or via a system power cable manufactured to be integrally fitted with an appropriate adapter for the user's power system. As is further readily apparent the countertop 810 of the lower kitchen cabinet 812 is still readily available for other uses.

Figure 3A:
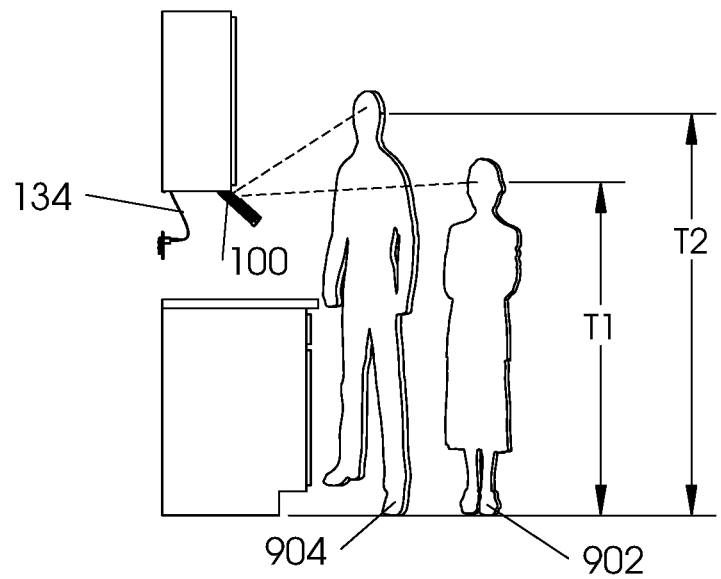
FIG. 3A is an environmental perspective view illustrating the charging and use system of FIG. 1A according to its use in kitchen operation, and showing line of sight to device screen.
Figure 3B:
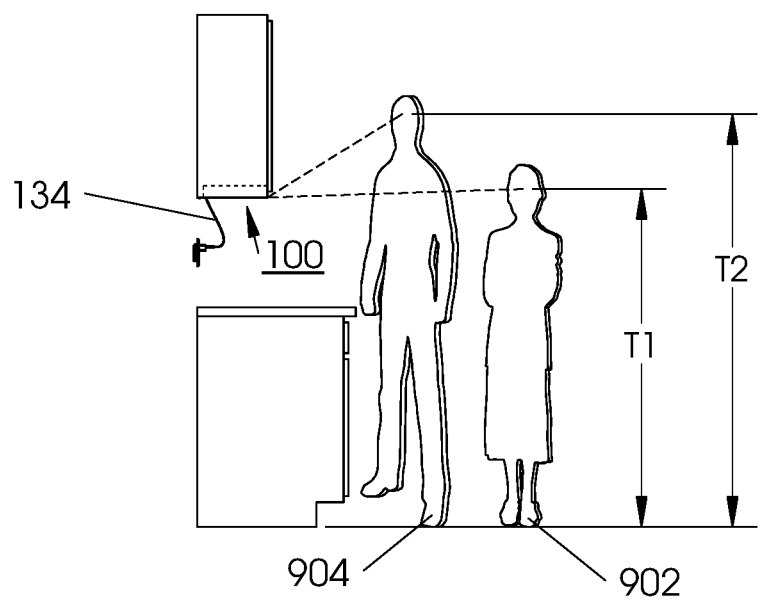
FIG. 3B is an environmental perspective view illustrating the charging and use system of FIG. 1A according to its use in kitchen operation, and showing line of sight to device screen with system retracted.

FIG. 3A depicts an environmental perspective view illustrating the line of sight of a user 902 and another user 904 of the under cabinet mobile broadband charging and use system 100 in an open state according to its use in kitchen operation while FIG. 3B depicts the line of sight of the same charging and use system 100 by the same users 902, 904 with the charging and use system 100 retracted below upper kitchen cabinet 814. T1 represents the sight line height of user 902 and T2 represents the sight line height of user 904. According to the Ergotron Ergonomics Data sheet (revision Apr. 1, 2014), based on studies of the United States population, the 5 percent female standing eye height is 55.7 inches and is represented by T1 for user 902 and the 95 percent male standing eye height is 68.6 inches which is represented by T2 for user 904. Heights T1 and T2 are depicted relative to a typical modern United States kitchen and 95 percent of users of the charging and use system 100 would be able to see the charging and use system 100 while it is hidden from 95 percent of users while in the retracted state. Only the power cord of the system power rewind 134 connected to the receptacle 808 is visible above the lower kitchen cabinet 812 to these users in the retracted state.

For usage with a standard upper kitchen cabinet which would have an under cabinet depth under the bottom shelf of between approximately 10.5 to 10.75 inches and a corresponding under cabinet height under the bottom shelf of approximately between 1.25 to 1.375 inches, the under cabinet mobile broadband device charging and use system 100 of approximately 1.25 inches height, 10.375 inches long, and 18 inches wide would remain out of sight of 95 percent of users. In a preferred embodiment of the under cabinet mobile broadband device charging and use system 100 the width of the charging and use system 100 is about 9.5 inches.

For use with a standard upper kitchen cabinet, in a preferred embodiment the lower shelf is preferentially about 0.040 inches thick, about 8 inches long, and about 8 inches wide and the upper shelf preferentially is about 0.040 inches thick, about 8 inches long, and about 8 inches wide.

Figure 4:
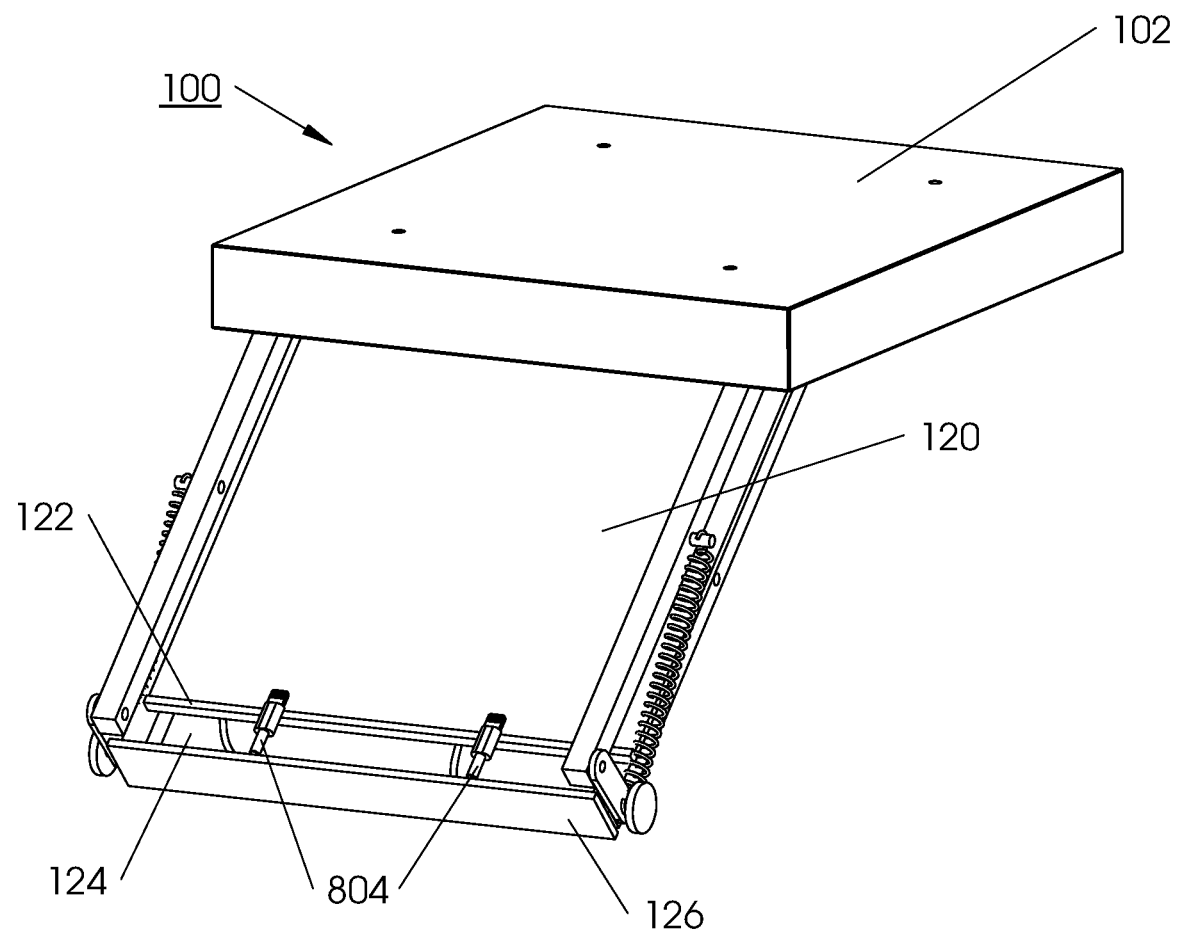
FIG. 4 is a perspective view illustrating a first embodiment of the present invention in an open position.
Figure 5:
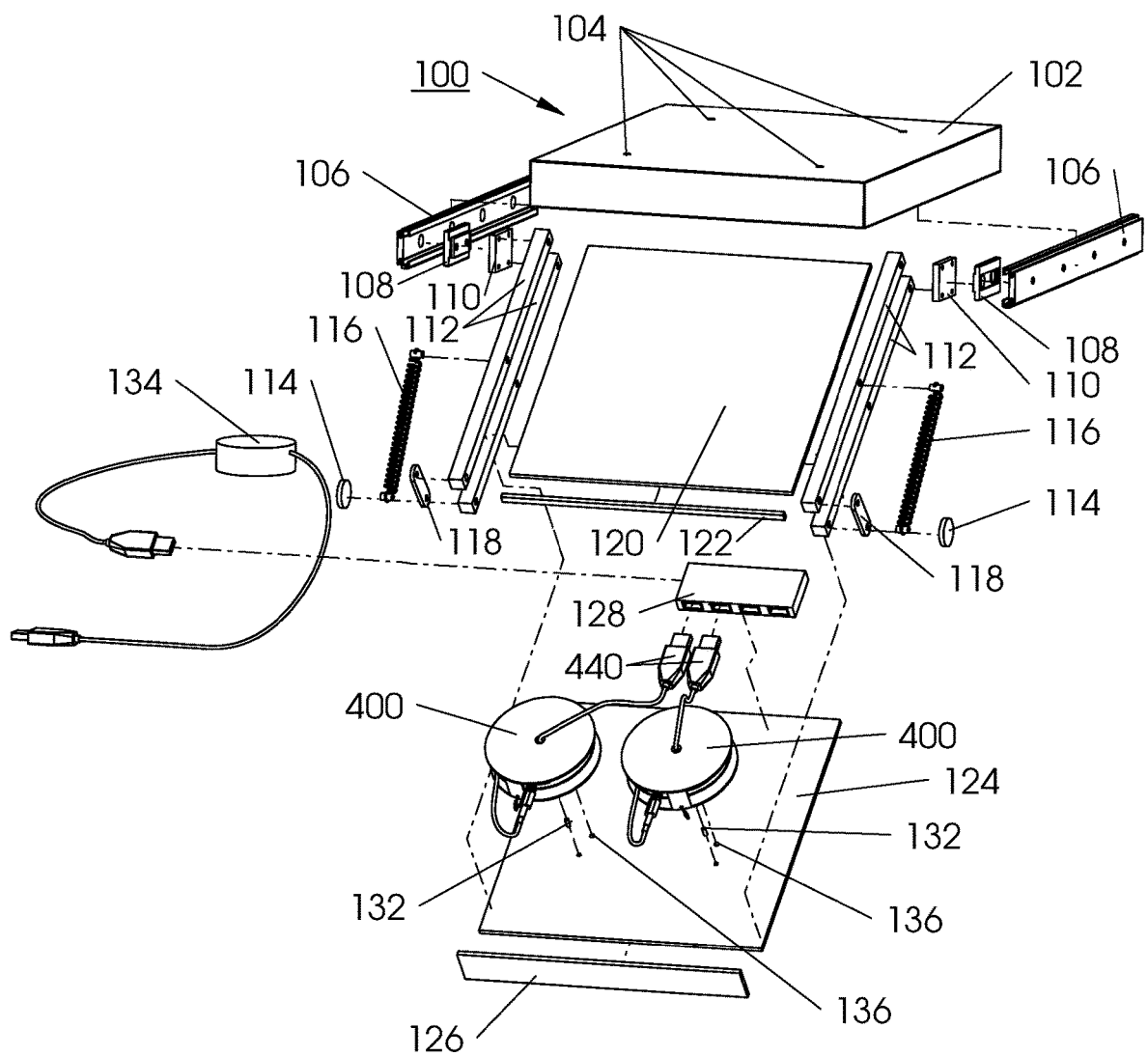
FIG. 5 is a detailed exploded perspective view illustrating the embodiment of FIG. 4 in an open position.

The first preferred embodiment of the under cabinet mobile broadband charging and use system 100 is further illustrated in FIGS. 4-8. Referring to FIGS. 4 and 5 which depict the charging and use system 100 in the extended (open) position (as assembled and in an exploded view), this embodiment makes use of cabling technology. The system housing 102 provides the structure for the assembly, which includes mounting holes 104. The system housing may be constructed of any suitable material typically used for containers such as plywood, metal, polymers, or environmentally friendly materials such as bamboo or hardwoods. While mounting via a screw type fastener as depicted is preferred, additional mounting methods may be used while not deviating from the teaching of the present invention. Such mounting methods may be integral to the system housing 102 and can include bolting; taping; adhesive; Velcro; brackets; an adhesive which the user may mount, unmount and then remount (such as the Command Damage Free Hanging Strips by 3M, Inc. of St. Paul, Minn.); and the like. A sleeve bearing guide rail 106 is mounted on each of the inner parallel surfaces of the system housing 102. A sleeve bearing carriage 108 rides on each sleeve bearing guide rail 106. A carriage spacer 110 is mounted to each sleeve bearing carriage 108 to provide proper spacing for the pivoting of the four support arms 112. The four support arms 112 are arranged in two pairs, one pair on each side of each shelf, the upper shelf 120 and the lower shelf 124. Each pair of support arms 112 connects to a support arm pivot bracket 118. The upper shelf 120 and the upper shelf front 122 are removable as an assembly. The combination of the carriage spacer 110, the pairs of support arms 112, and the support arm pivot bracket 118 provides the vertical articulated movement of the upper shelf 120 and lower shelf 124. The combination of the sleeve bearing carriage 108 and the sleeve bearing guide rail 106 provide the horizontal articulated movement of the upper shelf 120 and lower shelf 124. The tightening of a knob 114 and a spring 116 sets the articulated shelf angle when the charging and use system 100 is open.

The upper shelf front 122 mounted to the front of the upper shelf 120 provides the edge against which the broadband device rests for charging and use. The lower shelf front 126 mounted to the front of the lower shelf 124 assists in cable containment.

A power supply distribution block 128 mounted on the lower shelf 124 provides distribution of the DC voltage necessary for charging and operation. In the preferred embodiment depicted in FIGS. 5 and 6 two mobile broadband device charging and use systems 400 (rewind assembly 400) are presented and the power supply distribution block 128 is a multiport USB hub. The power supply distribution block 128 may optionally have ports such as high definition multimedia interface (HDMI), secure digital (SD), miniSD, Gigabit Ethernet, USB-C, and the like for connection to additional mobile broadband devices. Though two rewind assemblies 400 are depicted, in this present embodiment up to four rewind assemblies 400 could be mounted. To simplify the description, the components and usage of a single charging and use system 400 will be described. A rewind pin 132 is mounted to the lower shelf 124 upon which a mobile broadband device charging and use system 400 locates. A plunger locating hole 136 in the lower shelf 124 accommodates a plunger (located on the underside of the charging and use system 400 and not depicted in FIGS. 5-8) on the mobile broadband device charging and use system 400 that prevents its rotation. Wound inside the mobile broadband device charging and use system 400 is a mobile broadband device charging cable 804, for which one end is selected for compatibility with the broadband device to be used on the charging and use system 100. A USB cable 440 connects the mobile broadband device charging and use system 400 to the power supply distribution block 128. The mobile broadband device charging and use system 400 is removable so the mobile broadband device charging cable 804 can be changed as necessary for compatibility with other broadband devices. The charging cable 804 provides a means for supplying power from the power supply distribution block 128 to the electronic device.

The power supplied to the charging and use system 100 incorporates a system power rewind 134 (depicted in FIG. 5). The system power rewind 134 is a cable rewind that has a fixed length cable inlet with a USB connector, and a rewinding cable outlet with a USB connector. The system power rewind 134 mounts to the underside of the system housing 102. The fixed length USB cable connects the system power rewind 134 to a wall charger 818, which plugs into a receptacle 808. The rewinding USB cable supplies DC voltage to a power supply distribution block 128. As the user of the charging and use system 100 slides the upper shelf 120 and lower shelf 124, which are mounted on the sleeve bearing carriage 108, along the sleeve bearing guide rail 106, the system power cable rewind 134 maintains tension on the cable to the power supply distribution block 128. The system housing 102 is preferably an injection molded part capable of maintaining parallel sides and a flat top. Other materials such as wood, acrylonitrile butadiene styrene (ABS) plastic, aluminum, and the like, and manufacturing methods can be used to form the system housing 102.

Figure 6:
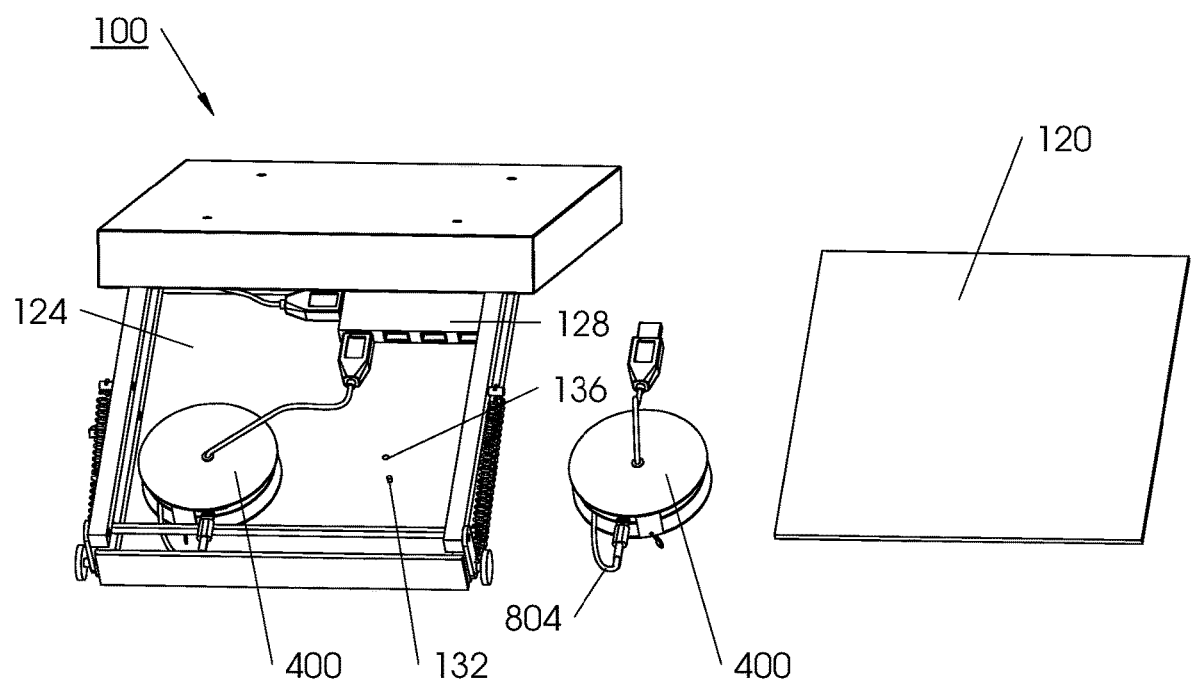
FIG. 6 is a perspective view illustrating the embodiment of FIG. 4 in an open position with the upper shelf and rewind assembly removed.

Upon installation of the under cabinet mobile broadband device charging and use system 100 to the underside of a cabinet using the mounting holes 104, the fixed length USB cable in the system power cable rewind 134 connects to the premise wiring receptacle 808. The user articulates the upper shelf 120 and lower shelf 124 to the desired inclined plane while sliding the shelf assembly forward, then tightens the knobs 114. The desired inclined plane may be adjusted from about 15 degrees from horizontal to about 75 degrees from horizontal but will preferentially be about 45 degrees from horizontal. Referring to FIG. 6, the user connects the mobile broadband device charging cable 804 to the broadband device. The user places one or more mobile broadband device 802 on the upper shelf 120. The upper shelf front 122 keeps the mobile broadband device 802 contained within the mobile broadband device charging and use system 100. The user may not have a need to charge the devices. Whether charging or not, the user retains full visual and audio access to the devices.

Figure 7:
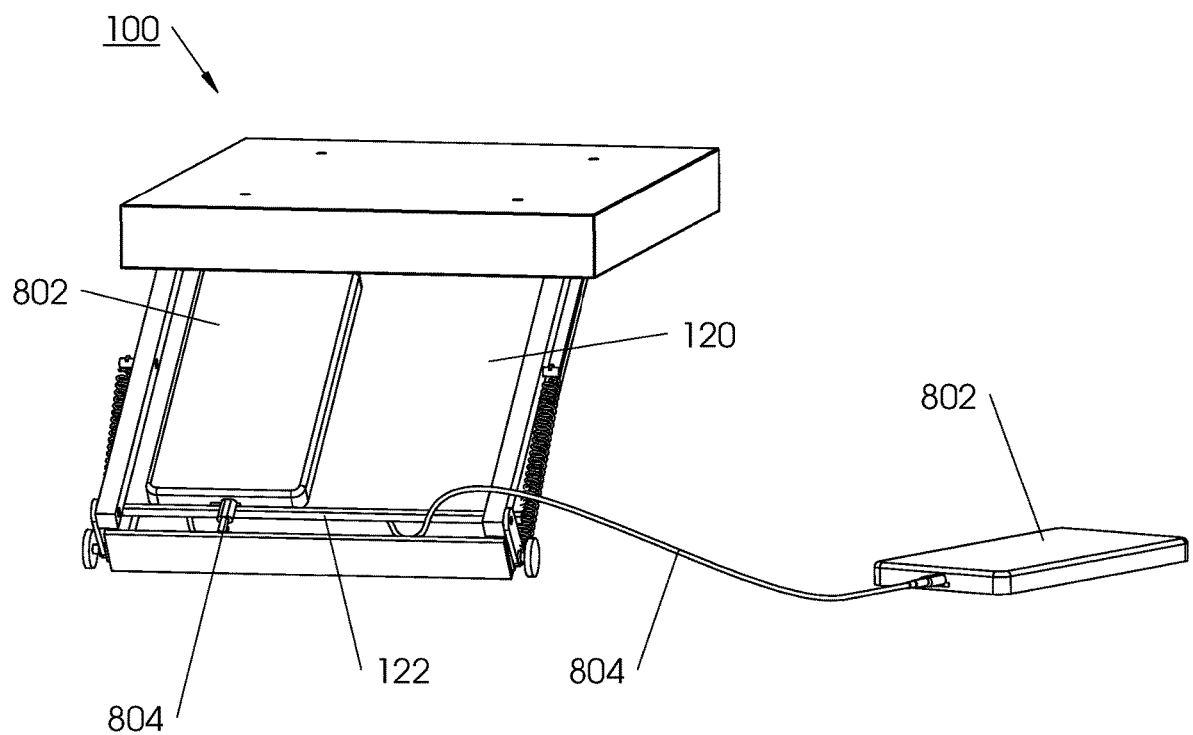
FIG. 7 is a perspective view illustrating the embodiment of FIG. 4 in an open position with two smaller broadband devices, one of which is removed for use.

Referring to FIG. 7, in this first embodiment of the present invention, the user removes the upper shelf 120 to expose the lower shelf 124 upon which is mounted the power supply distribution block 128 and the rewind pin 132. The user places on the rewind pin 132 the mobile broadband device charging cable rewind and use system 400, which is loaded with a mobile broadband device charging cable 804 that has a compatible connector for the mobile broadband device to be charged. As the mobile broadband device charging and use system 400 is placed on the rewind pin 132, the plunger 426 is inserted into the plunger locating hole 136 which inhibits the rotation of the mobile broadband device charging and use system 400 structure during operation. The user connects the USB cable 440 to the power supply distribution block 128. The broadband device compatible end of the mobile broadband charging cable 804 connects to the broadband device to be charged. Multiple broadband devices can be accommodated this way. One mobile broadband device 802 has been connected to the charging cable 804 and placed upon the upper shelf 120 and the other mobile broadband device has been connected to the charging cable 804 for use, after which for placement on the upper shelf 120. The user replaces the upper shelf 120 and the one or more mobile broadband devices can be placed on it for charging. The adjustability of the upper shelf 120 allows the user to retain full visual and audio access to the devices placed upon it. The mobile broadband devices can be smartphones, tablets, PDAs and the like, of any size, shape or orientation. The charging and use system 100 can accommodate side or bottom connections, regardless of charging power requirements.

Figure 8:
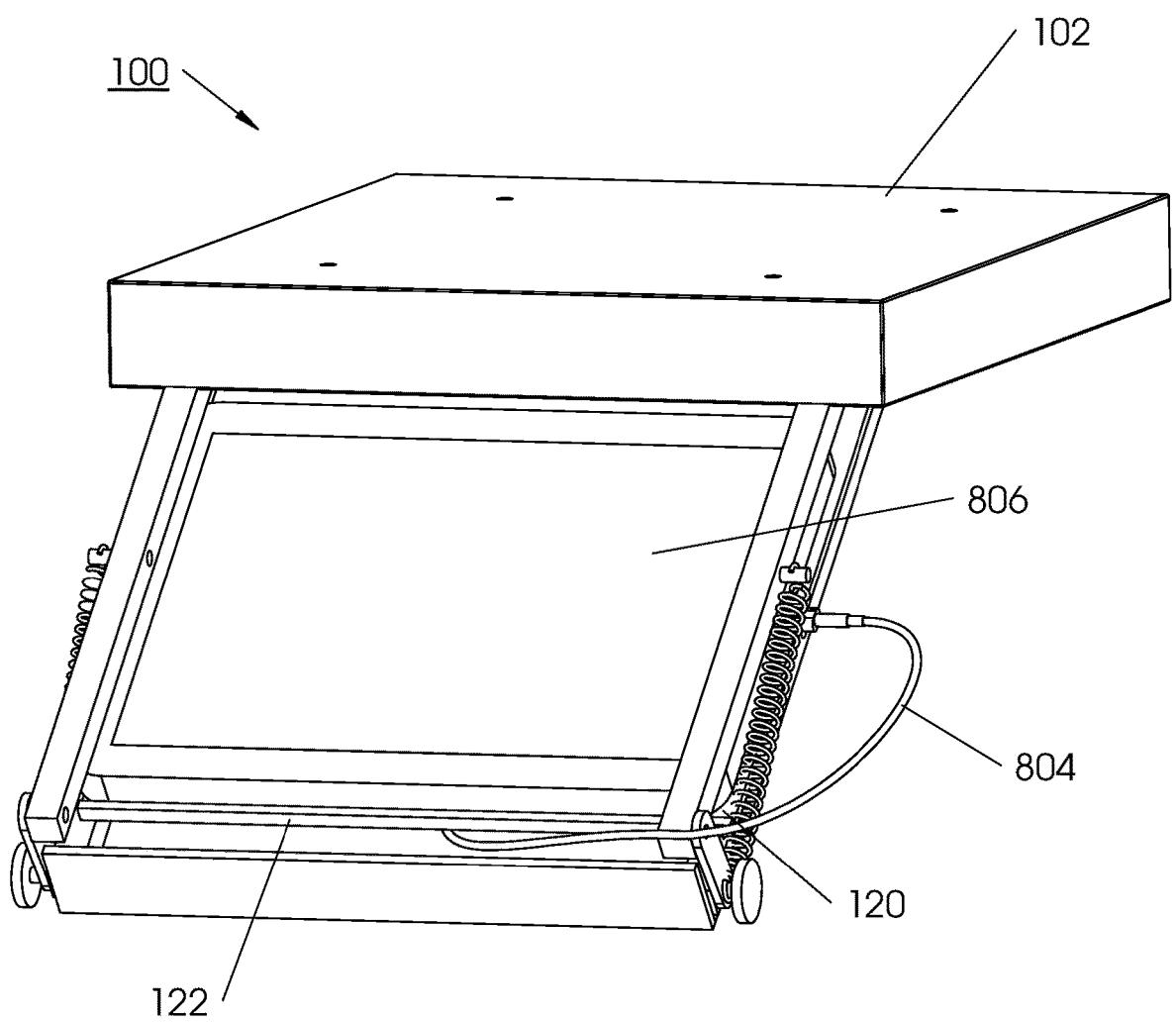
FIG. 8 is a perspective view illustrating the embodiment of FIG. 4 in an open position with one larger broadband device.
Figure 9:
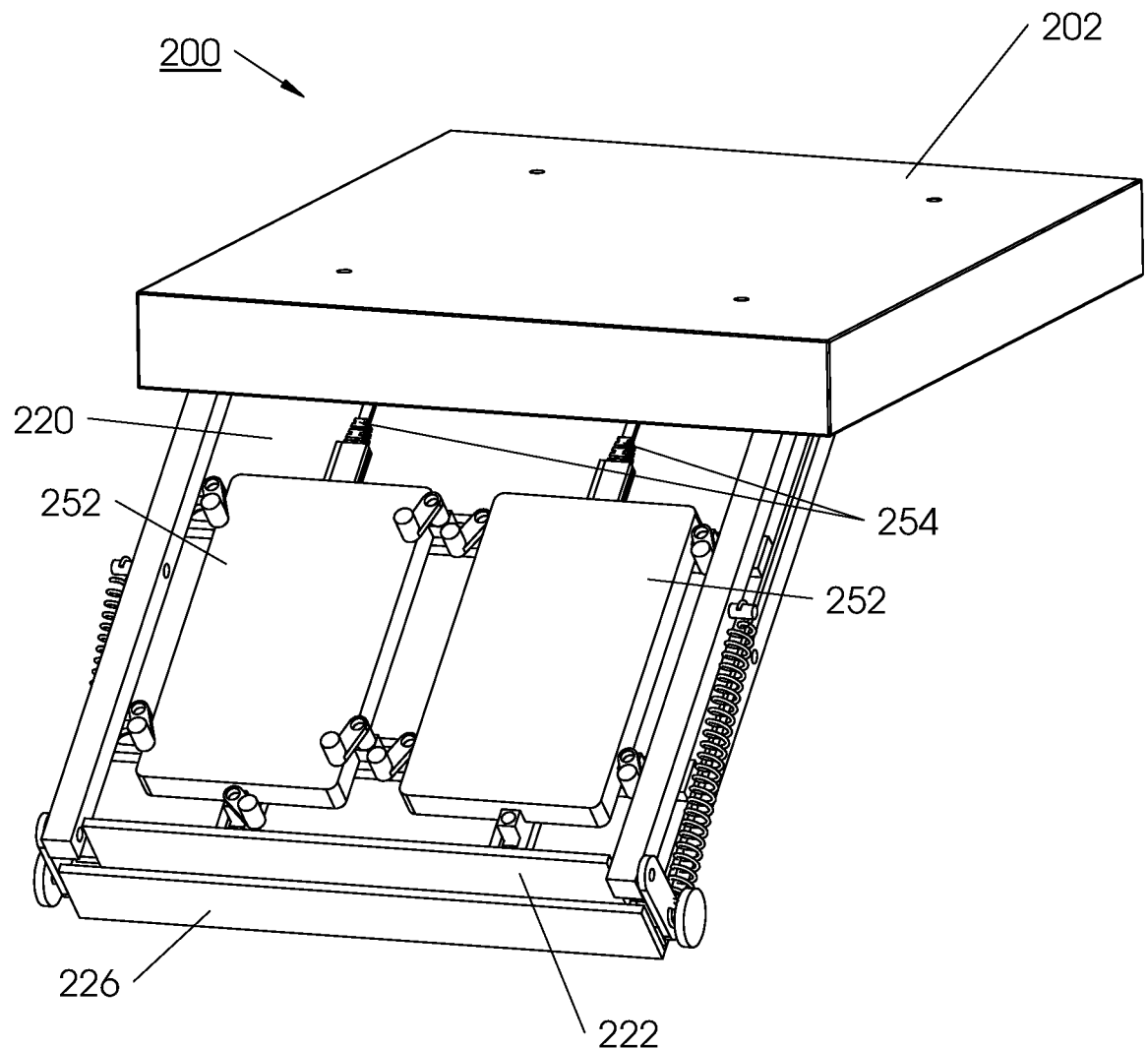
FIG. 9 is a perspective view illustrating a second embodiment of the present invention in an open position.
Figure 10:
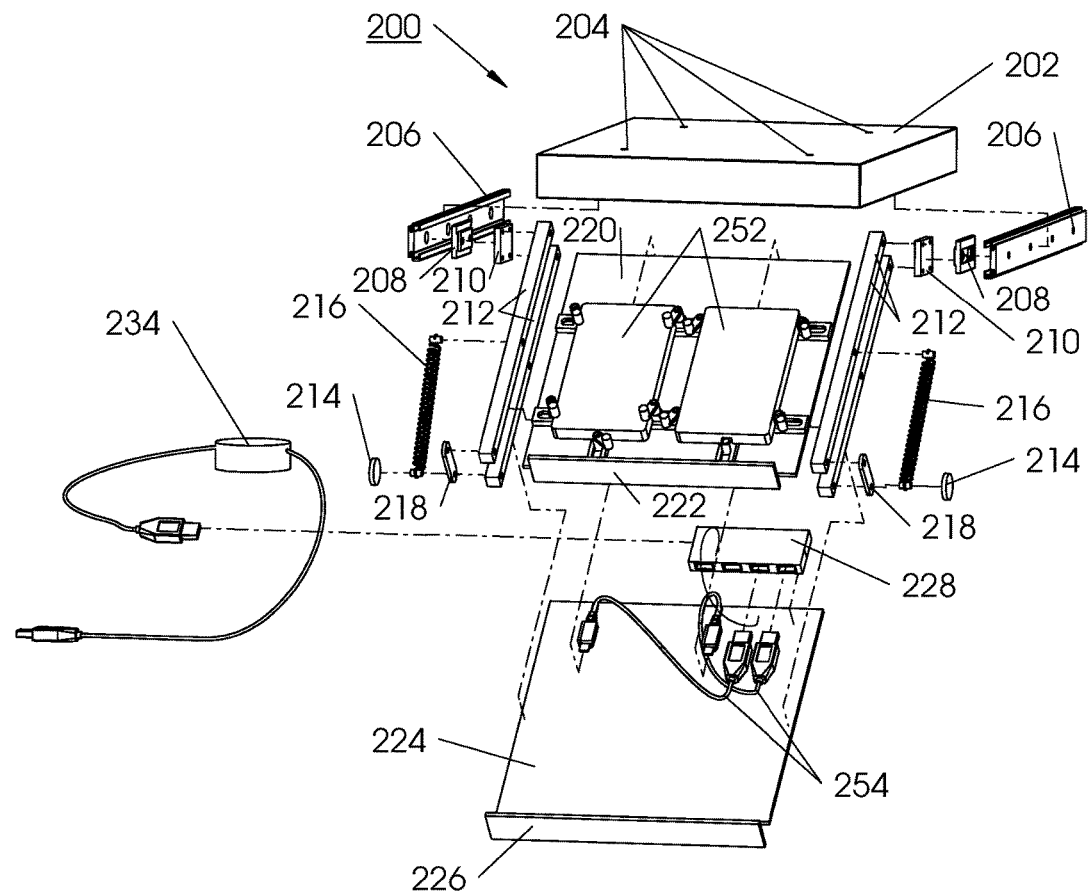
FIG. 10 is a detailed exploded perspective view illustrating the embodiment of FIG. 9 in an open position.
Figure 11:
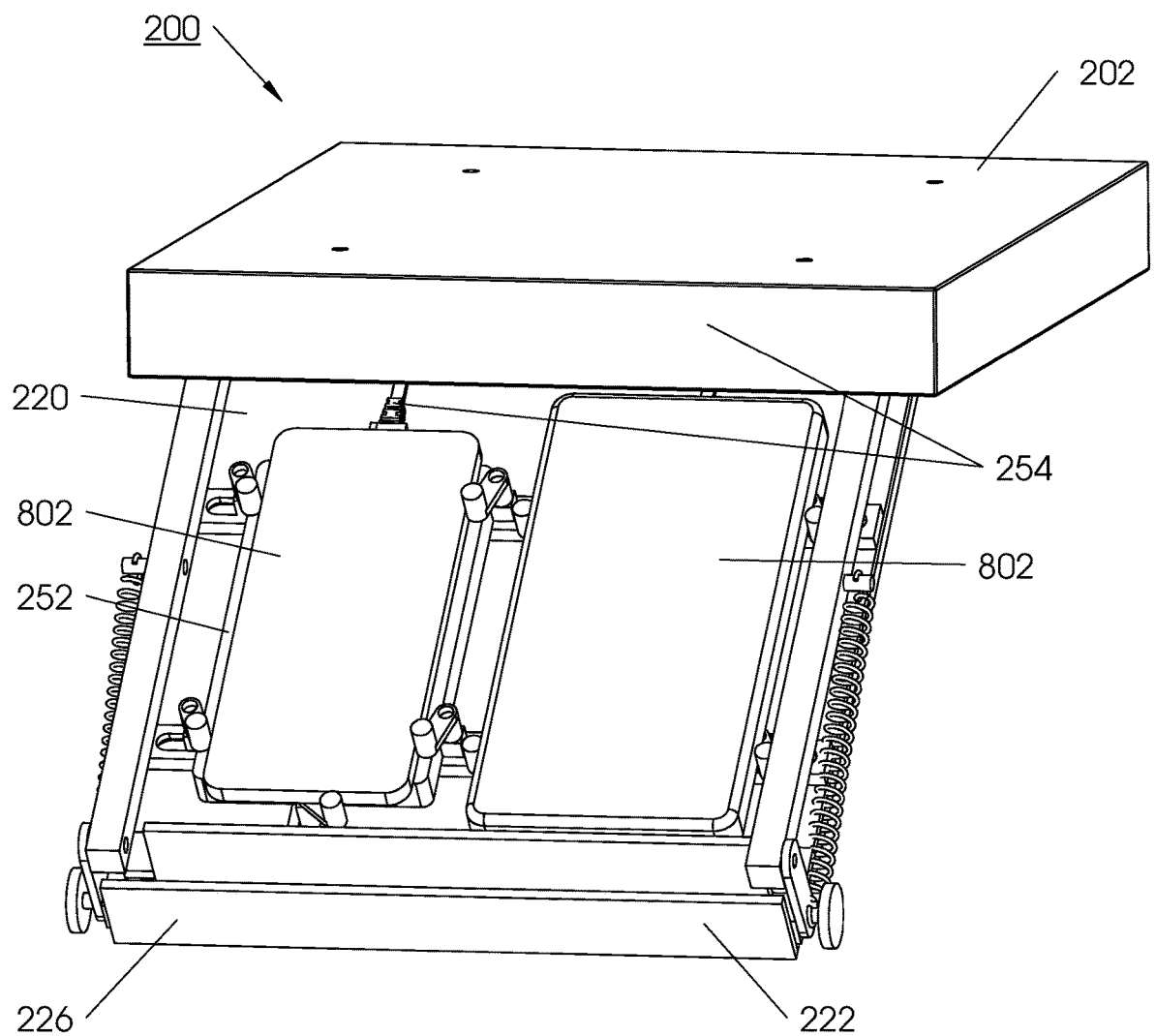
FIG. 11 is a perspective view illustrating the embodiment of FIG. 9 in an open position with two smaller broadband devices.
Figure 12:
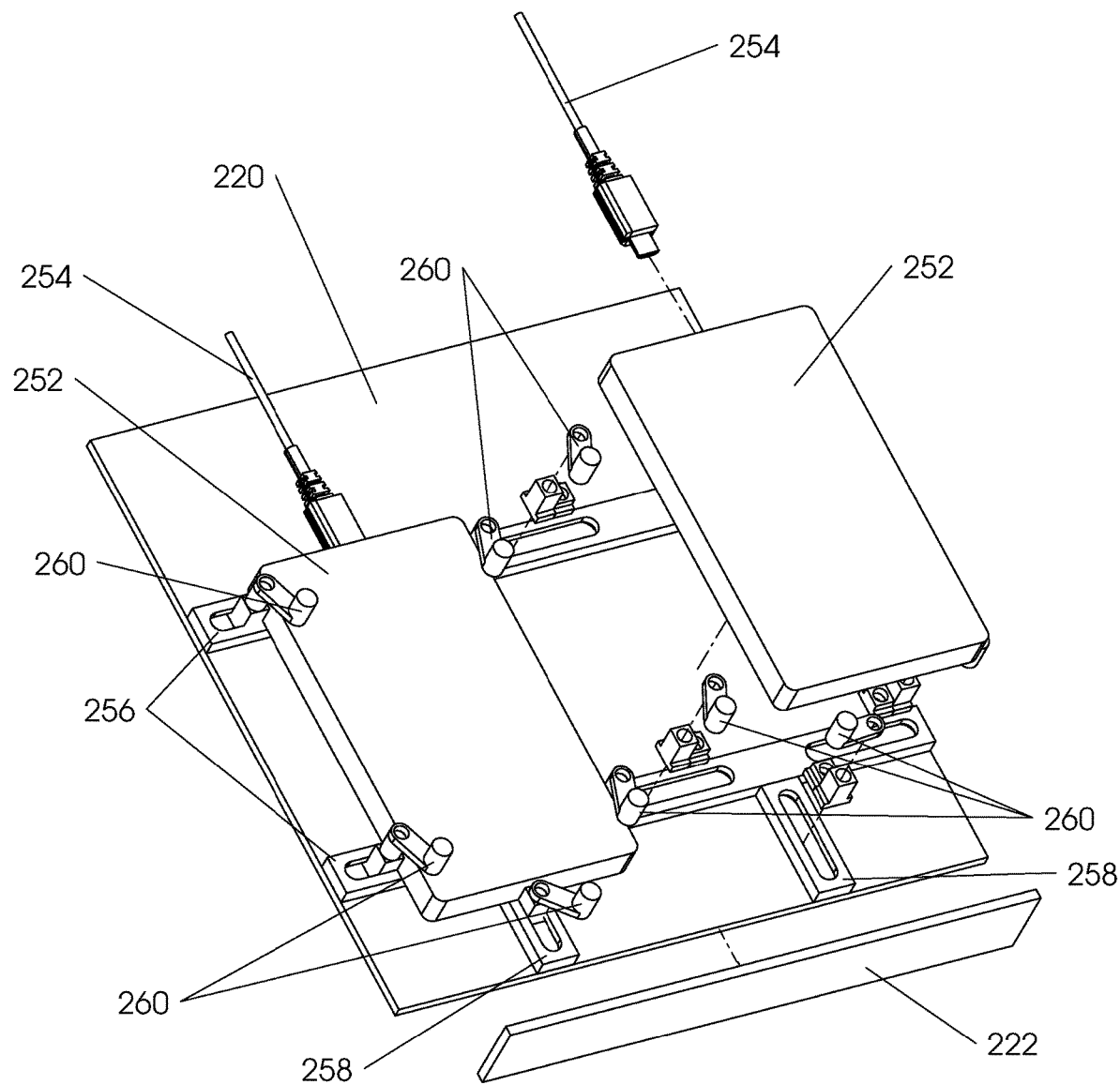
FIG. 12 is a detailed exploded perspective view illustrating the embodiment of FIG. 9 of the upper shelf.

Referring to FIG. 8, the charging and use system 100 is in use with a single large mobile broadband device 806, depicted upon the upper shelf 120 resting against the upper shelf front 122 and is and connected to the mobile broadband charging cable 804.

Referring again to FIGS. 7 and 8, FIG. 8 depicts a large broadband device 806, such as a tablet, connected to the charging and use system 100 via a side connection and FIG. 7 depicts mobile broadband devices 802 each connected to the charging and use system 100 via a bottom connection. The upper shelf 120 may optionally be fitted with extendible arms (not depicted) which would allow for larger devices to be used with the system. For example a large screen tablet that would be too wide to fit onto the base charger unit while a smartphone was also being charged may now be able to fit on the system along with the smartphone. Though the charging and use system 100 is not a storage case, devices can remain charging and functioning when the upper shelf 120 is fully retracted.

A second embodiment of the present invention of an under cabinet mobile broadband charging and use system 200 is illustrated in FIGS. 9-12. This embodiment makes use of inductive charging technology. Similarly to the system in the embodiment previously described above, a system housing 202 provides the structure for the assembly, which includes mounting holes 204. The system housing 202 may be constructed of any suitable material typically used for containers such as plywood, metal, polymers, or environmentally friendly materials such as bamboo or hardwoods. While mounting via a screw type fastener as depicted is preferred, additional mounting methods may be used while not deviating from the teaching of the present invention. Such mounting methods may be integral to the system housing 202 and can include bolting; taping; adhesive; Velcro; brackets; an adhesive which the user may mount, unmount and then remount (such as the Command Damage Free Hanging Strips by 3M, Inc. of St. Paul, Minn.); and the like. A sleeve bearing guide rail 206 is mounted on each of the inner parallel surfaces of the system housing 202. A sleeve bearing carriage 208 rides on each sleeve bearing guide rail 206. A carriage spacer 210 is mounted to each sleeve bearing carriage 208 to provide proper spacing for the pivoting of the four support arms 212. Each pair of support arms 212 connects to a support arm pivot bracket 218. The upper shelf 220 and lower shelf 224 are mounted to each of the support arms 212. The upper shelf 220 and the upper shelf front 222 are removable as an assembly. The combination of the carriage spacer 210, a pair of support arms 212, and the support arm pivot bracket 218 provides the vertical articulated movement of the upper shelf 220 and lower shelf 224. The combination of the sleeve bearing carriage 208 and the sleeve bearing guide rail 206 provide the horizontal articulated movement of the upper shelf 220 and lower shelf 224. The tightening of a knob 214 and a spring 216 sets the articulated shelf angle when the charging and use system 200 is open. The desired articulated shelf angle may be adjusted from about 15 degrees from horizontal to about 75 degrees from horizontal but will preferentially be about 45 degrees from horizontal.

The upper shelf front 222 mounted to the front of the upper shelf 220 provides the edge against which the broadband device rests. The lower shelf front 226 mounted to the front of the lower shelf 224 assists in cable containment.

T-slotted long extrusion slides 256 and t-slotted short extrusion slides 258 are mounted to the upper shelf 220. T-slotted extrusion locators 260 are placed in the t-slotted long extrusion slides 256 and t-slotted extrusion short slides 258. They provide the necessary adjustability to position a wireless charger 252 (e.g. Choetech Qi Wireless Charger T513S available at amazon.com), and the mobile broadband device 802 to ensure alignment of charging coils. The t-slotted extrusion locators 260 can accommodate a broadband device for charging that is smaller or larger than the wireless charger 252. As depicted in FIGS. 9-12, the charging and use system 200 may accommodate two wireless chargers 252 and up to two mobile broadband devices 802. As those skilled in the art are aware, by increasing the width of the charging and use system 200 additional wireless chargers could be used.

A power supply distribution block 228 mounted on the lower shelf 224 provides distribution of the DC voltage necessary for charging and operation. A wireless charger cable 254 connects the wireless charger 252 to the power supply distribution block 228.

The power supplied to the charging and use system 200 incorporates a system power rewind 234. The system power rewind 234 is a cable rewind that has a fixed length cable inlet with a USB connector, and a rewinding cable outlet with a USB connector. The system power rewind 234 mounts to the underside of the system housing 202. The fixed length USB cable connects the system power rewind 234 to a wall charger 818, which plugs into a receptacle 808. The rewinding USB cable supplies DC voltage to a power supply distribution block 228. As the user of the charging and use system 200 slides the upper shelf 220 and lower shelf 224, which are mounted on the sleeve bearing carriage 208, along the sleeve bearing guide rail 206, the system power cable rewind 234 maintains tension on the cable to the power supply distribution block 228. By replacing the wireless charger 252 with a power mat or other inductive charging devices such as charging mats, inductive rings, inductive cases, and the like, the present invention may be used with the power mat or other inductive charging device by mobile broadband devices 802 such as smartphones or large mobile broadband devices such as tablet computers which are compatible for charging with these devices.

Upon installation of the under cabinet mobile broadband device charging and use system 200 to the underside of a cabinet using the mounting holes 204, the retractable USB cable in the system power cable rewind 234 connects to the premise wiring receptacle 808. The user articulates the upper shelf 220 and lower shelf 224 to the desired inclined plane while sliding the shelf assembly forward, then tightens the knobs 214. The user places one or more mobile broadband device 802 on the wireless charger 252 which is mounted to the upper shelf 220. The user adjusts the multiple t-slot locators 260 in the t-slotted long extrusion slides 256 and t-slotted short extrusion slides 258 to position the wireless charger 252 and the mobile broadband device 802 to ensure alignment of charging coils. The t-slotted extrusion locators 260 can be rotated to accommodate a broadband device for charging that is smaller or larger than the wireless charger 252. Upon location of the t-slot locators 260 for containment of the desired size mobile broadband device 802, the self-contained t-slot locator 260 set screws are tightened. Multiple devices can be accommodated this way. One or more mobile broadband devices can be placed on the shelf for charging. Whether charging or not, the adjustability of the upper shelf 220 allows the user to retain full visual and audio access to the devices placed upon it. The mobile broadband devices can be smartphones, tablets, personal data assistants (PDAs) and the like, of any size, shape or orientation. The charging and use system 200 can accommodate side or bottom connections, regardless of charging power requirements. The upper shelf 220 may optionally be fitted with extendible arms (not depicted) which would allow for larger devices to be used with the system. Though the charging and use system 200 is not a storage case, devices can remain charging and functioning while the upper shelf 220 is fully retracted.

Figure 13:
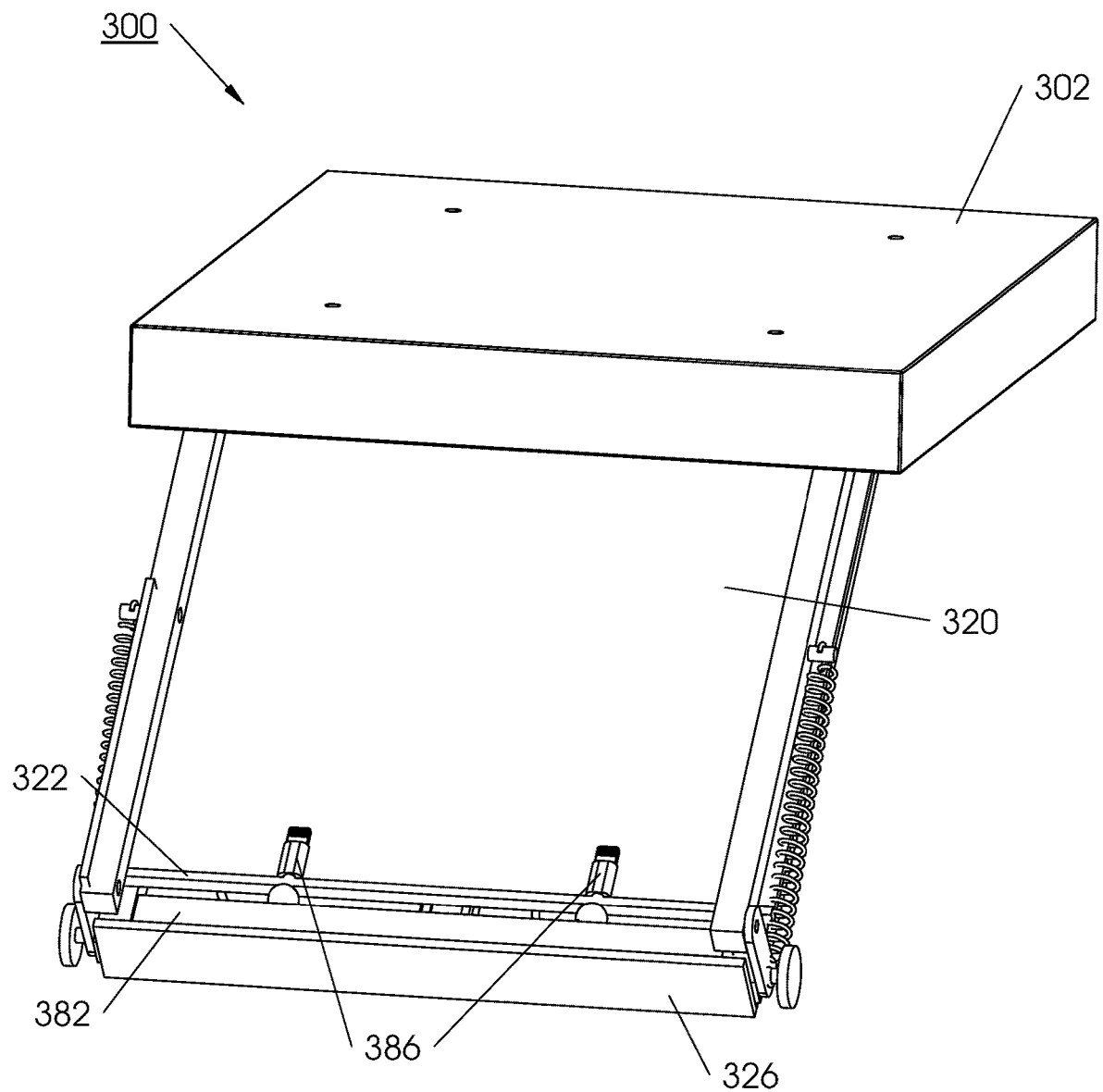
FIG. 13 is a perspective view illustrating a third embodiment of the present invention in an open position.
Figure 14:
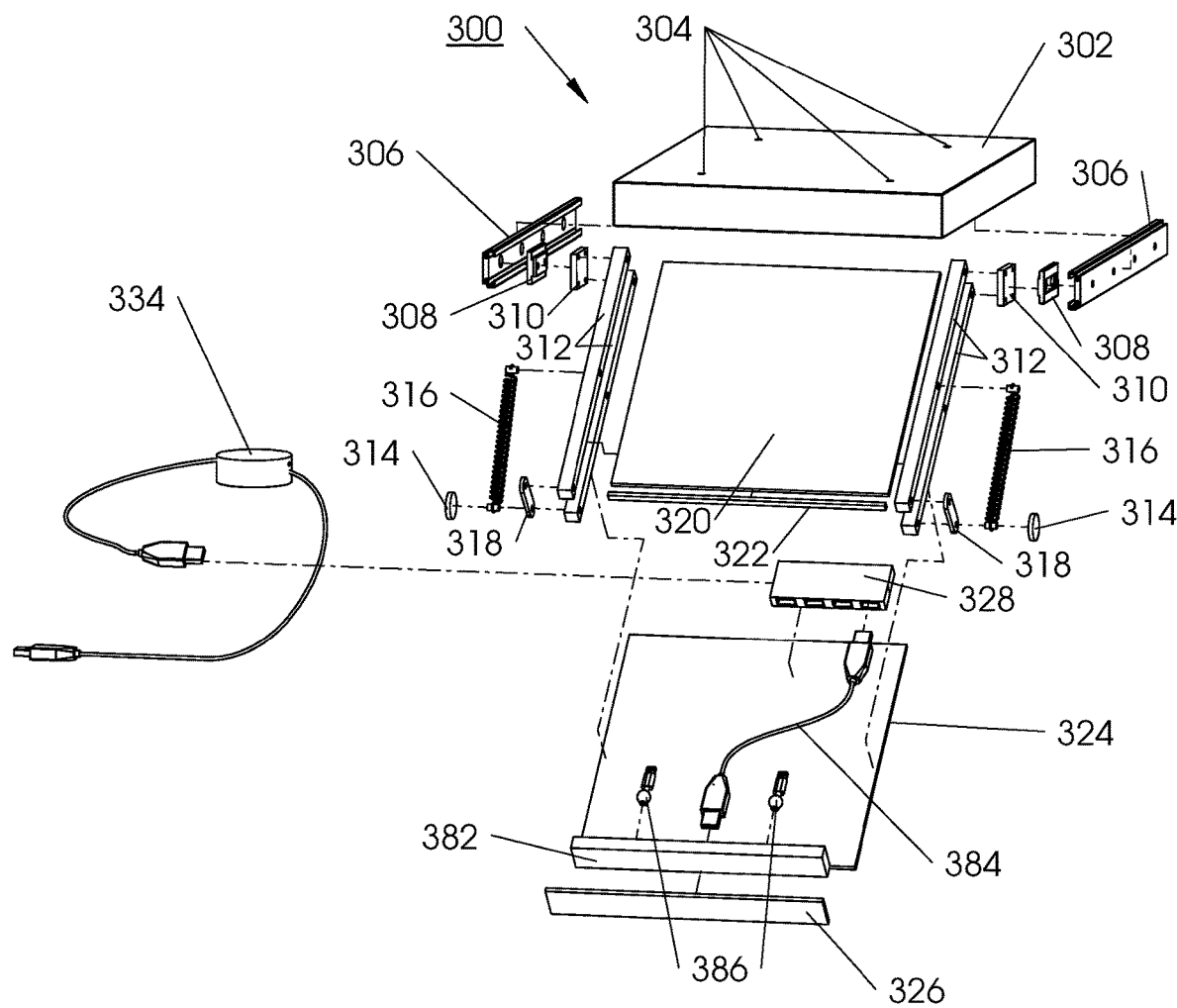
FIG. 14 is a detailed exploded perspective view illustrating the embodiment of FIG. 13 in an open position.
Figure 15:
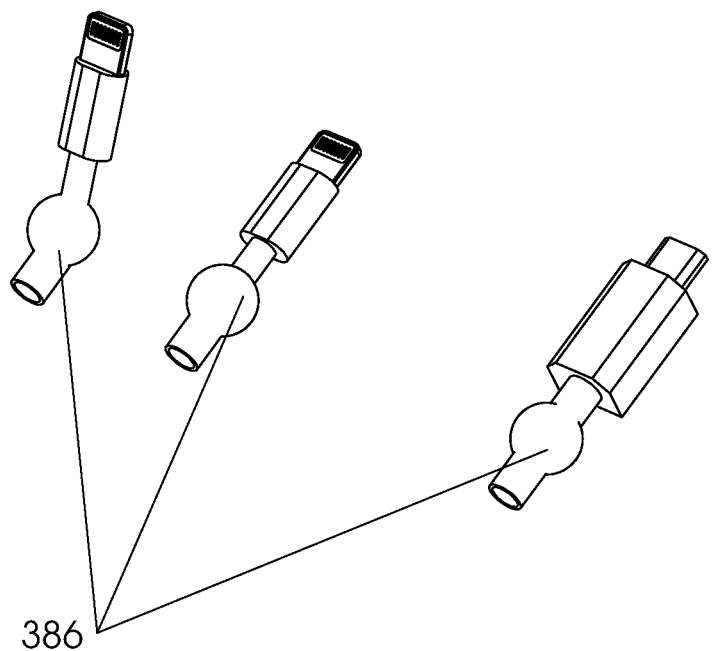
FIG. 15 is a perspective view illustrating the removable and pivoting tips in support of the embodiment of FIG. 13.
Figure 16:
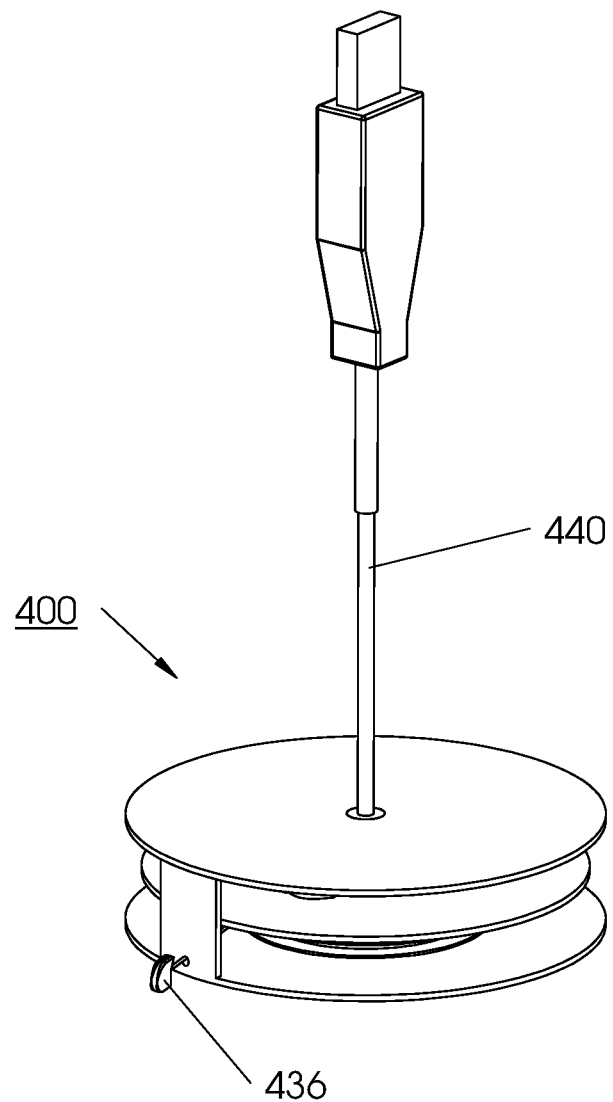
FIG. 16 is a perspective view illustrating a first embodiment of the charging cable rewind and use system, and showing its general features.

A third embodiment of the present invention of an under cabinet mobile broadband charging and use system 300 is illustrated in FIGS. 13-15. This embodiment makes use of removable/pivoting charging tip technology. Similarly to the systems in the embodiments previously described above, a system housing 302 provides the structure for the assembly, which includes mounting holes 304. The system housing 302 may be constructed of any suitable material typically used for containers such as plywood, metal, polymers, or environmentally friendly materials such as bamboo or hardwoods. While mounting via a screw type fastener as depicted is preferred, additional mounting methods may be used while not deviating from the teaching of the present invention. Such mounting methods may be integral to the system housing 302 and can include bolting; taping; adhesive; Velcro; brackets; an adhesive which the user may mount, unmount and then remount (such as the Command Damage Free Hanging Strips by 3M, Inc. of St. Paul, Minn.); and the like. A sleeve bearing guide rail 306 is mounted on each of the two inner parallel surfaces of the system housing 302. A sleeve bearing carriage 308 rides on each sleeve bearing guide rail 306. A carriage spacer 310 is mounted to each sleeve bearing carriage 308 to provide proper spacing for the pivoting of the four support arms 312. Each pair of support arms 312 connects to a support arm pivot bracket 318. The upper shelf 320 and lower shelf 324 are mounted to each of the lower support arms 312. The upper shelf 320 and the upper shelf front 322 are removable as an assembly. The combination of the carriage spacer 310, a pair of support arms 312, and the support arm pivot bracket 318 provides the vertical articulated movement of the upper shelf 320 and lower shelf 324. The combination of the sleeve bearing carriage 308 and the sleeve bearing guide rail 306 provide the horizontal articulated movement of the upper shelf 320 and lower shelf 324. The tightening of a knob 314 and a spring 316 sets the articulated shelf angle when the charging and use system 300 is open.

An upper shelf front 322 mounted to the front of the upper shelf 320 provides the edge against which the broadband device rests. A lower shelf front 326 mounted to the front of the lower shelf 324 assists in cable containment.

A charging bar 382 is mounted to the upper shelf 320. A removable/pivoting tip 386 is selected for compatibility with the mobile broadband device 802 to be used on the charging and use system 300. The removable/pivoting tip 386 is inserted into the charging bar 382, and the mobile broadband device 802. A power supply distribution block 328 mounted on the lower shelf 324 provides distribution of the DC voltage necessary for charging and operation. A USB to USB cable 384 connects the charging bar 382 with the power supply distribution block 328.

The power supplied to the charging and use system 300 incorporates a system power rewind 334. The system power rewind 334 is a cable rewind that has a fixed length cable inlet with a USB connector, and a rewinding cable outlet with a USB connector. The system power rewind 334 mounts to the underside of the system housing 302. The fixed length USB cable connects the system power rewind 334 to a wall charger 818, which plugs into a receptacle 808. The rewinding USB cable supplies DC voltage to a power supply distribution block 328. As the user of the charging and use system 300 slides the upper shelf 320 and lower shelf 324, which are mounted on the sleeve bearing carriage 308, along the sleeve bearing guide rail 306, the system power cable rewind 334 maintains tension on the cable to the power supply distribution block 328. Upon installation of the under cabinet mobile broadband device charging and use system 300 to the underside of a cabinet using the mounting holes 304, the retractable USB cable in the system power cable rewind 334 connects to the premise wiring receptacle (not depicted) in a similar manner to the previously described embodiments. The user articulates the upper shelf 320 and lower shelf 324 to the desired inclined plane while sliding the shelf assembly forward, then tightens the knobs 314. The user places one or more mobile broadband device (not depicted) on the upper shelf 320. The user selects the removable/pivoting tip 386 for compatibility with the mobile broadband device to be used. The removable/pivoting tip 386 is inserted into the charging bar 382, and the mobile broadband device. Multiple devices can be accommodated this way. One or more mobile broadband devices can be placed on the shelf for charging. The user may not have a need to charge the devices. Whether charging or not, the adjustability of the upper shelf 320 allows the user to retain full visual and audio access to the devices placed upon it. The mobile broadband devices can be smartphones, tablets, PDAs and the like, of any size, shape or orientation. The charging and use system 300 can accommodate side or bottom connections, regardless of charging power requirements. The upper shelf 320 may optionally be fitted with extendible arms (not depicted) which would allow for larger devices to be used with the system. Though the charging and use system 300 is not a storage case, devices can remain charging and functioning when the upper shelf 320 is fully retracted.

In the third embodiment, the user selects the removable/pivoting tip 306 for compatibility with the broadband device to be used on the charging and use system 100. The removable/pivoting tip 306 is inserted into the charging bar 302, and the broadband device such as a smartphone. Multiple devices can be accommodated this way. One or more mobile broadband devices can be placed on the shelf for charging.

Additional detail of a preferred embodiment of the mobile broadband device charging cable rewind and use system 400 (also referred to as rewind assembly 400) of the present invention is illustrated in FIGS. 16-23. As will be readily apparent to those skilled in the art, the rewind assembly 400 can be configured to incorporate additional connector types, such as USB Type-B, USB Type-C, USB Mini-A and Mini-B, USB Micro-A and Micro-B, D-sub, and the like. This method involves the use of a USB receptacle 438 into which a mobile broadband device charging cable 804 can be plugged. An upper spool flange 402 and lower spool flange 424 are fastened together by a screw which provides for the structure of the assembly. Although in the embodiment presented in FIG. 19, the upper spool flange 402 and the lower spool flange 424 are fastened together using a screw, as will be readily apparent to those skilled in the art, the two spool flanges may be connected by any of several available means for fastening such as rivets, clips, chemical adhesives, and the like. Located between the upper spool flange 402 and the lower spool flange 424, is a stack assembly (stack) comprising an upper grommet 404, a charging cable half spool 406, a middle spool flange 410, a rewind spring housing/ratchet wheel 412, a wave disc spring 416, a string spool 420, and a lower grommet 422.

The rewind spring housing/racket wheel 412 houses a spring steel rewind 414. A rewind string 418 is wound around the string spool 420. A string pull 436 is attached to the user end of the string. A plunger 426 compresses the wave disc spring 416, engaging the string spool 420 with the rewind spring housing/ratchet wheel 412 for simultaneous rotation of the string spool 420 with the rewind spring housing/ratchet wheel 412.

On one end, the spring steel rewind 414 inserts into a slot in the rewind spring housing/ratchet wheel 412 and the other end inserts into a slot in the lower spool flange 424. The rotation of the stack winds the spring steel.

A pawl 428 is mounted on a pawl mount 432. A torsion spring 430 maintains tension of the pawl 428 for ratcheting against a star wheel 434, which allows locking of the pawl 428. The locked pawl 428 engages the teeth of the rewind spring housing/ratchet wheel 412.

The USB receptacle 438 is integral to a charging cable spool pivoting section 408, which pivots from the charging cable half spool 406 for plugging of the mobile broadband device charging cable 804.

Wired to the back of the USB receptacle 438 is a USB cable 440 that exits the upper grommet 404 for connection to an environmental power source.

The upper spool flange 402 and lower spool flange 424 are joined to create a single stationary structure that supports the rotating stack. The upper grommet 404 provides for rotation around the USB cable 440, and accommodates the rotation of the stack on the top of the assembly. The rotation of the bottom of the stack is accommodated by the lower grommet 422.

The parts of the mobile broadband device charging cable rewind and use system 400 are preferably injection molded. Other materials such as wood, metal, and the like and manufacturing methods such as extrusion molding, carpentry, and the like can be used to fabricate the parts without avoiding the teachings of the present invention. The rewind string 418 is small diameter with high tensile strength. Preferred materials for the rewind string include nylon, polyethylene, polyethylene coated metallic wire, and the like.

To prepare the mobile broadband device charging cable rewind and use system 400 for operation, it first must be loaded with the user's mobile broadband device charging cable 804.

A rewind assembly with an upper spool flange and a lower spool flange each possessing a diameter of about 3 inches and with a height from the base of the lower spool flange to the upper surface of the upper flange of about 0.73 inches will accommodate a charging cable up to 40 inches long with a diameter of 0.01 inches.

In the first rewind assembly 400 embodiment, the user pushes the plunger 426 to compress the wave disc spring 416, engaging the string spool 420 with the rewind spring housing/ratchet wheel 412 for simultaneous rotation of the string spool 420 with the rewind spring housing/ratchet wheel 412. The user pulls the string pull 436 to unwind the rewind string 418 to the desired rewind length of the mobile broadband device charging cable 804. The hinged charging cable spool pivoting section 408 swings from the charging cable half spool 406 exposing the USB receptacle 438 into which is plugged the mobile broadband device charging cable 804. After closing the charging cable spool pivoting section 408, the user releases the string pull 436, allowing for the reverse rotation of the string spool 420, the charging cable half spool 406, and the charging cable spool pivoting section 408. The result is full retraction of the rewind string 418 and the charging cable 804. The user releases the plunger 426 to complete the loading process of the mobile broadband device charging cable rewind and use system 400.

Figure 17:
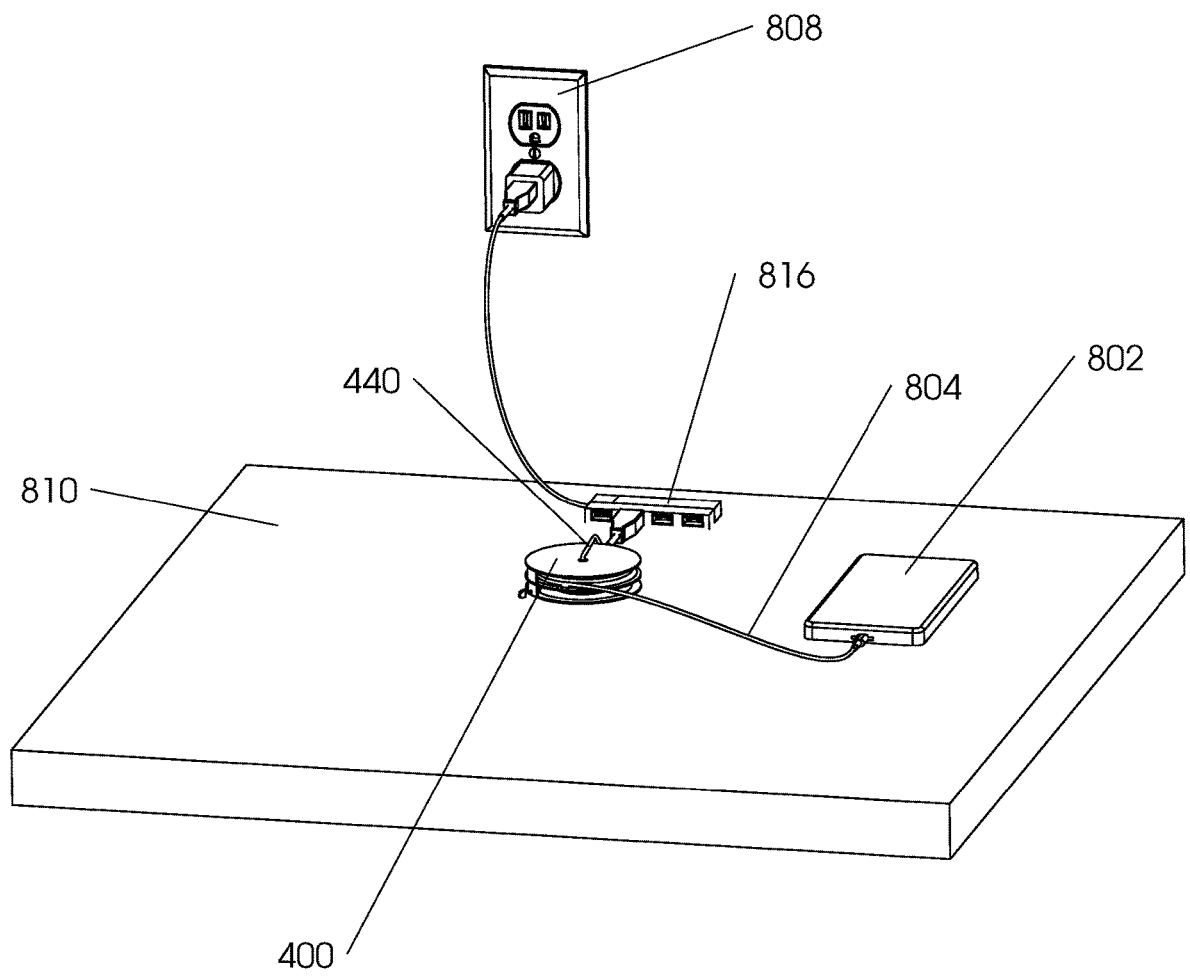
FIG. 17 is an environmental perspective view illustrating the embodiment of FIG. 16 according to its use in kitchen operation.
Figure 18:
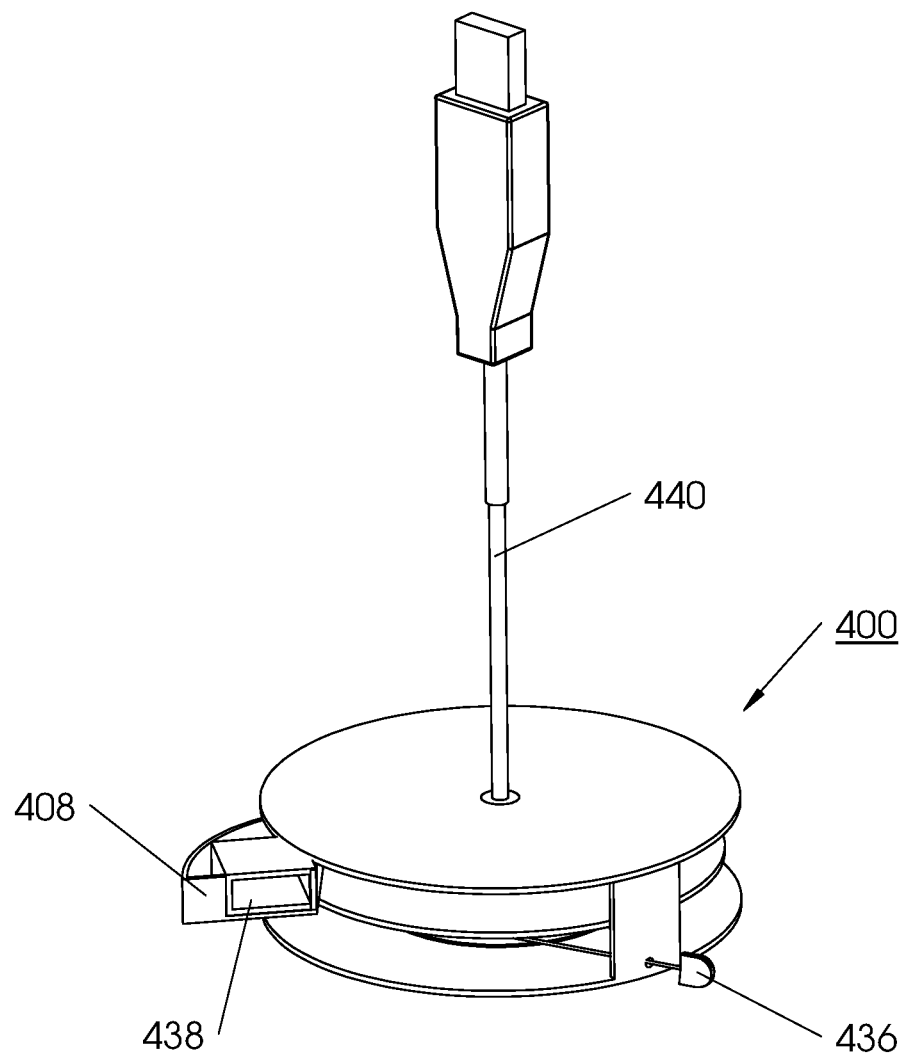
FIG. 18 is a perspective view illustrating the embodiment of FIG. 16 in an open position.
Figure 19:
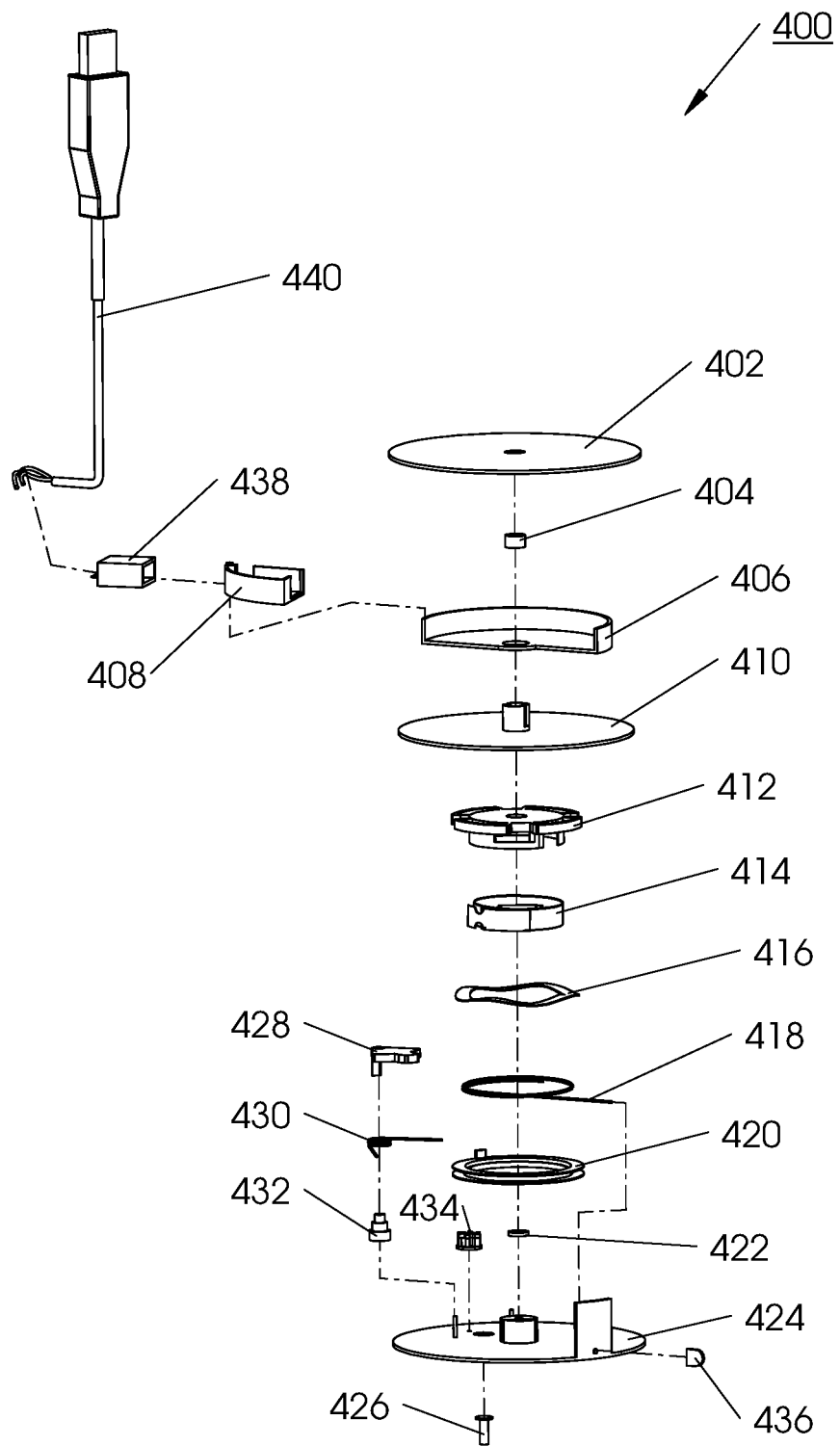
FIG. 19 is a detailed exploded perspective view illustrating the embodiment of FIG. 16 in an open position.
Figure 20:
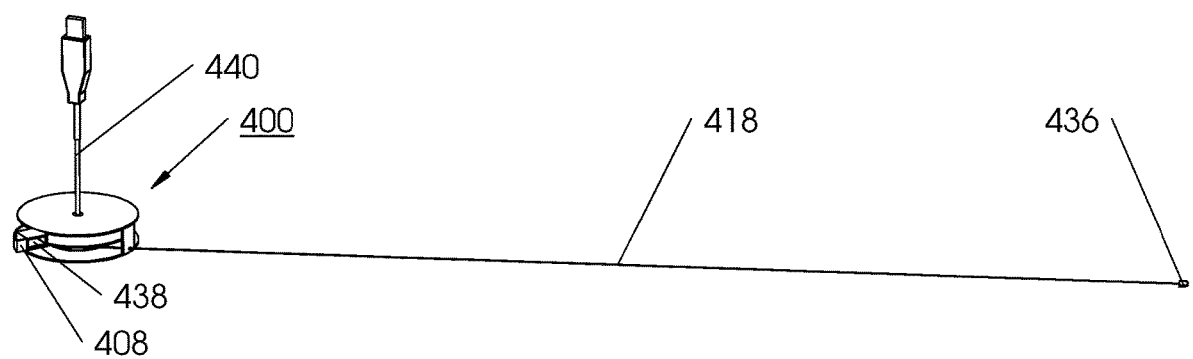
FIG. 20 is a perspective view illustrating the embodiment of FIG. 16 in an open position according to the invention in operation, with the rewind string fully extended.
Figure 21:
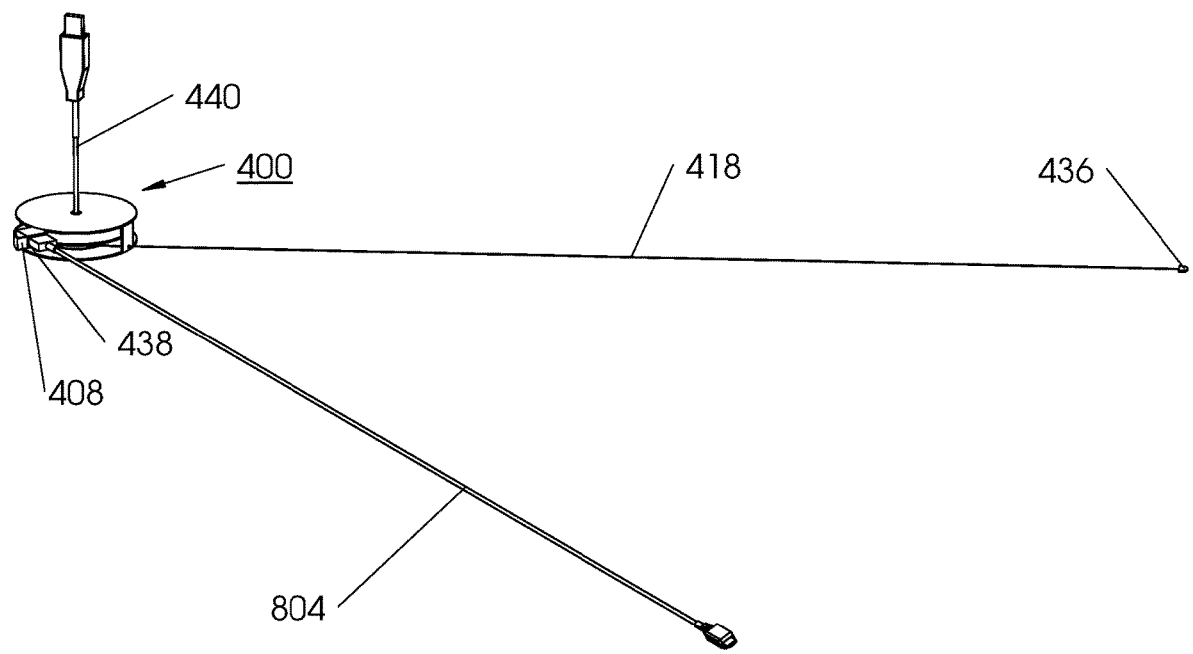
FIG. 21 is a perspective view illustrating the embodiment of FIG. 16 in an open position according to the invention in operation with the rewind string fully extended and the mobile broadband charging cable connected.
Figure 22:
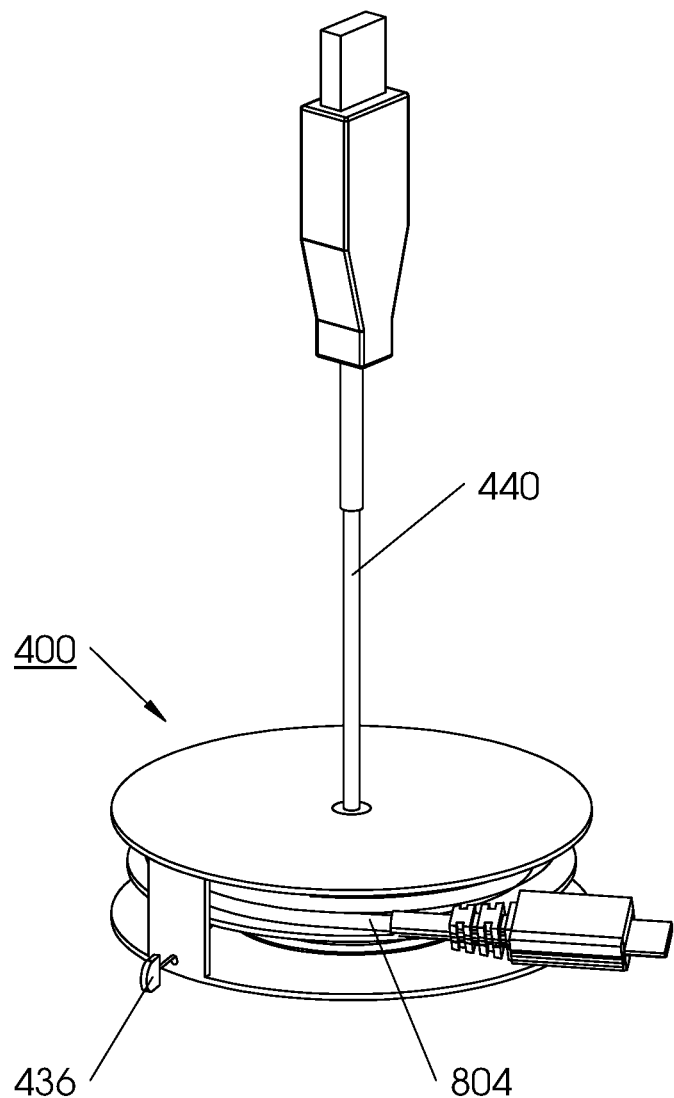
FIG. 22 is a perspective view illustrating the embodiment of FIG. 16 in a fully wound position according to the invention in operation, with the mobile broadband charging cable wound.
Figure 23:
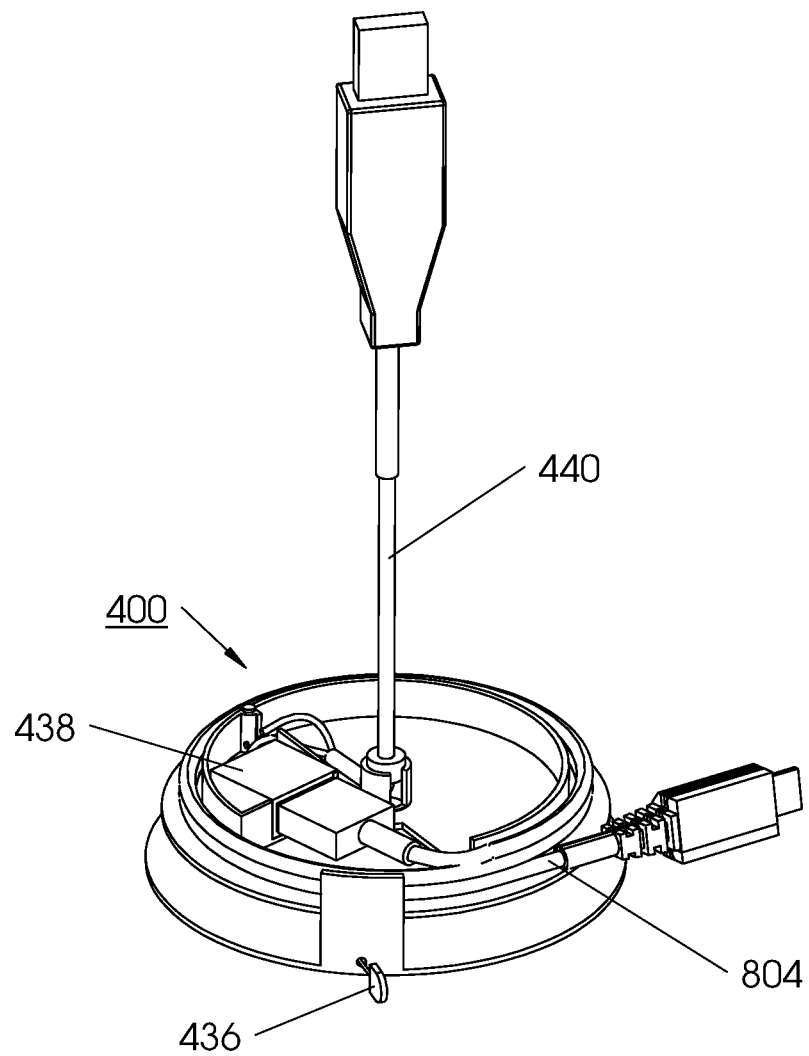
FIG. 23 is a perspective view illustrating the embodiment of FIG. 16 in a fully wound position according to the invention in operation, with the mobile broadband charging cable wound, and the upper spool flange removed.
Figure 24:
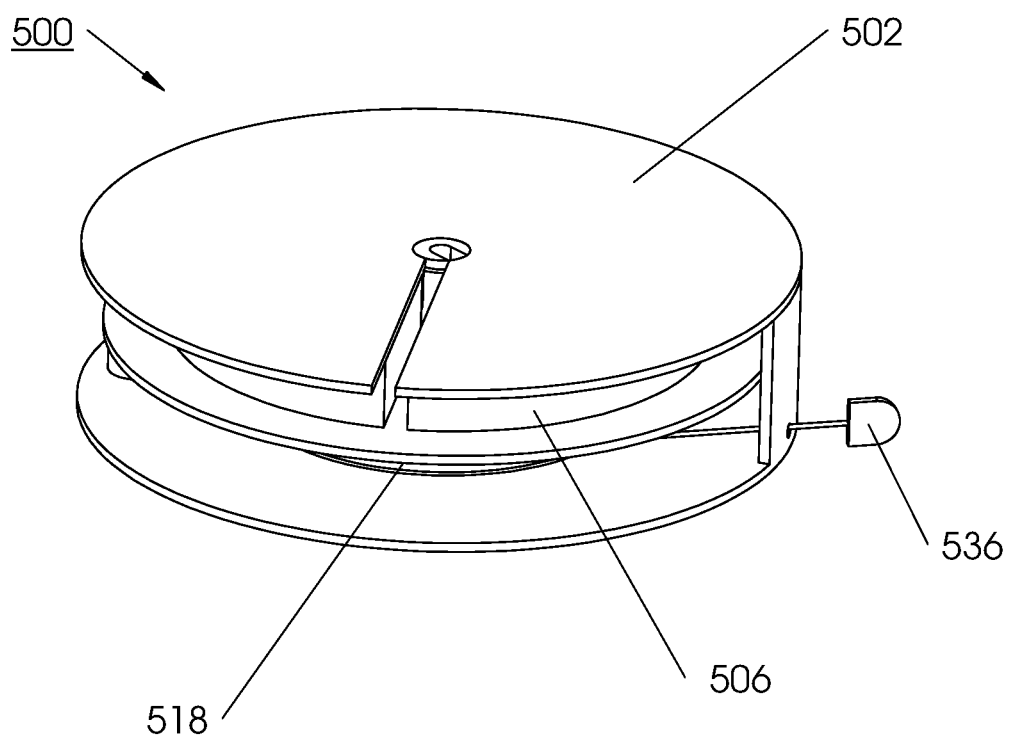
FIG. 24 is a perspective view illustrating a second embodiment of the charging cable rewind and use system, and showing its general features.
Figure 25:
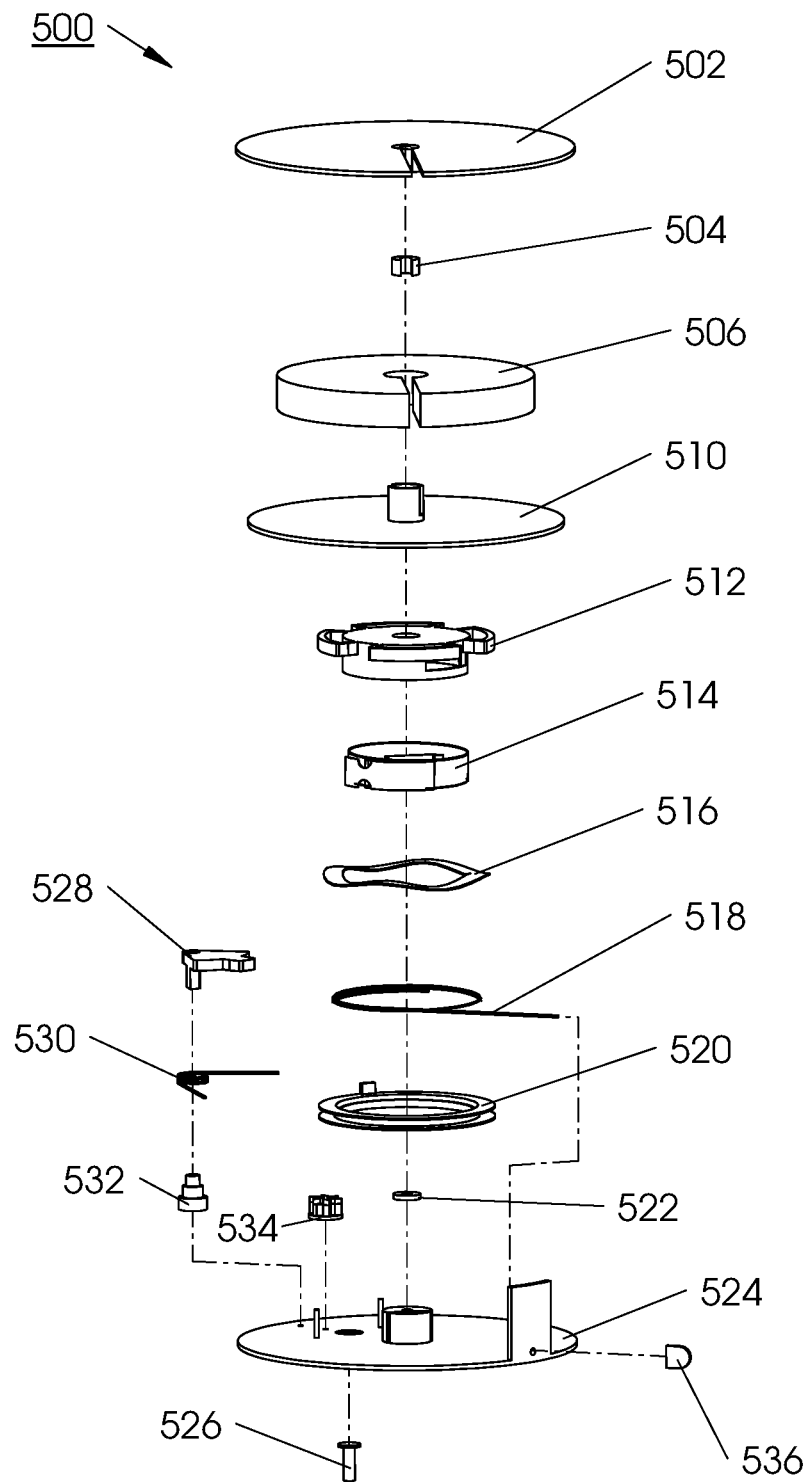
FIG. 25 is a detailed exploded perspective view illustrating the embodiment of FIG. 24.
Figure 26:
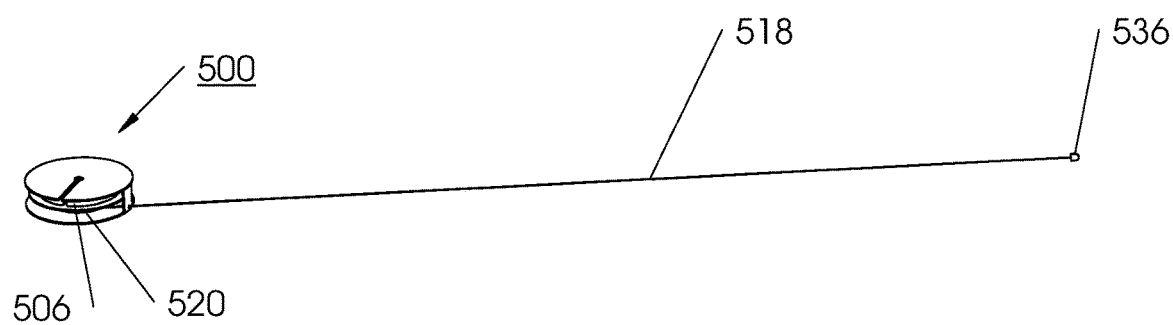
FIG. 26 is a perspective view illustrating the embodiment of FIG. 24 according to the invention in operation, with the rewind string fully extended.
Figure 27:
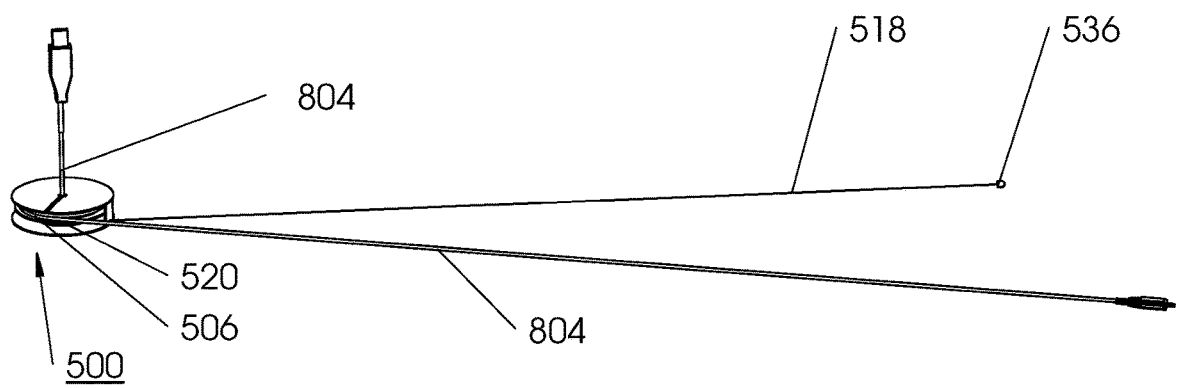
FIG. 27 is a perspective view illustrating the embodiment of FIG. 24 according to the invention in operation with the rewind string fully extended and the mobile broadband charging cable inserted.
Figure 28:
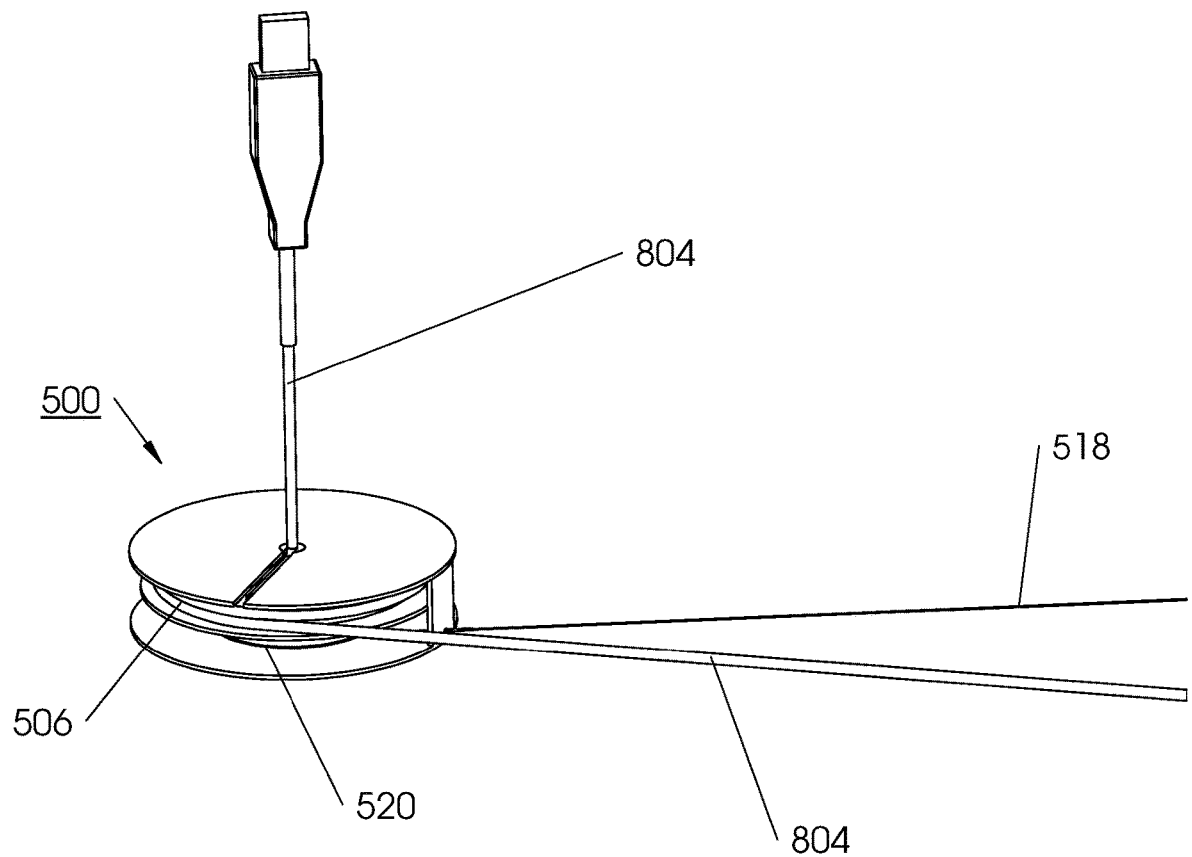
FIG. 28 is an enlarged perspective view illustrating the embodiment of FIG. 24 according to the invention in operation with the rewind string fully extended and the mobile broadband charging cable inserted.
Figure 29:
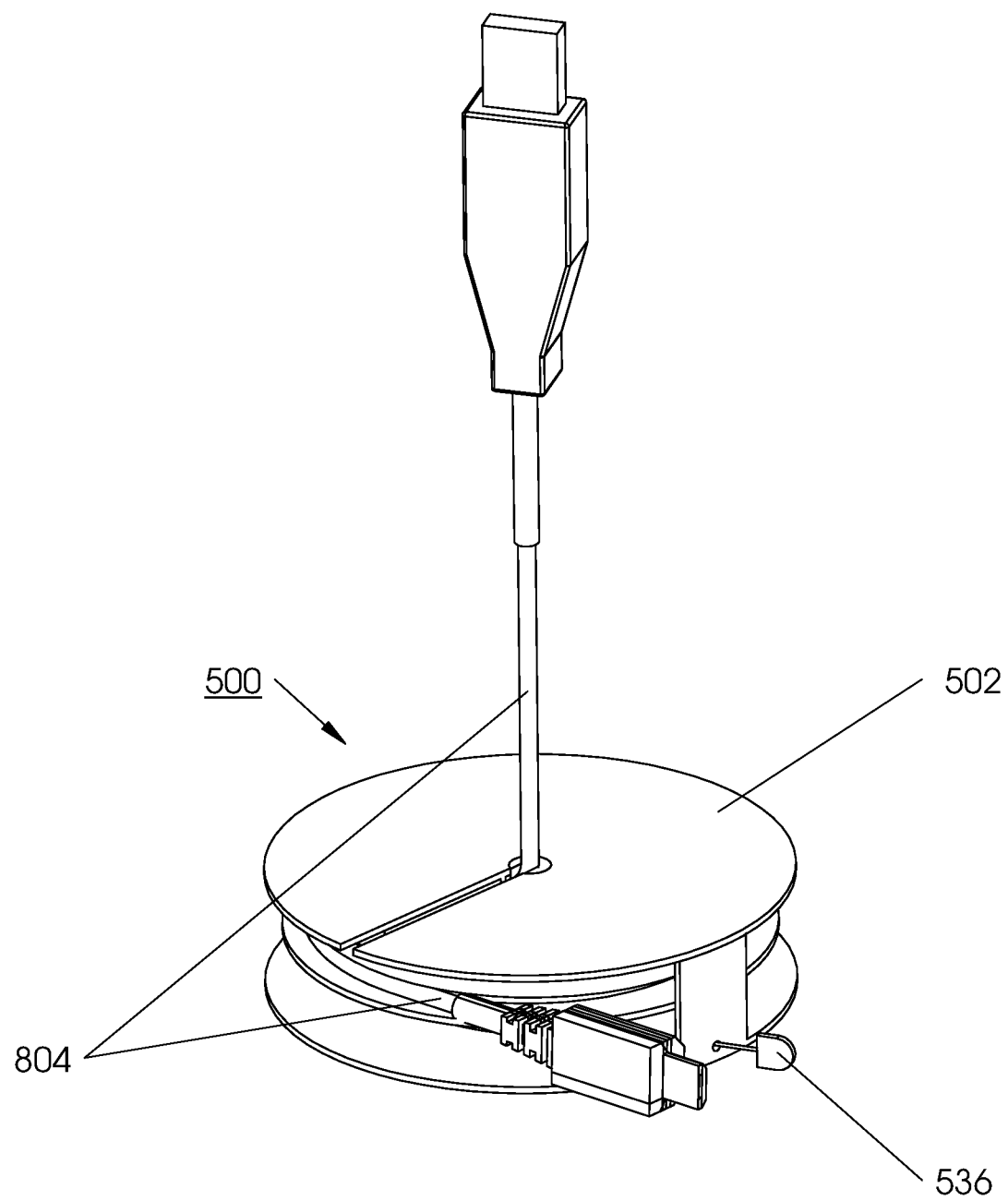
FIG. 29 is a perspective view illustrating the embodiment of FIG. 24 in a fully wound position according to the invention in operation, with the mobile broadband charging cable wound.
Figure 30:
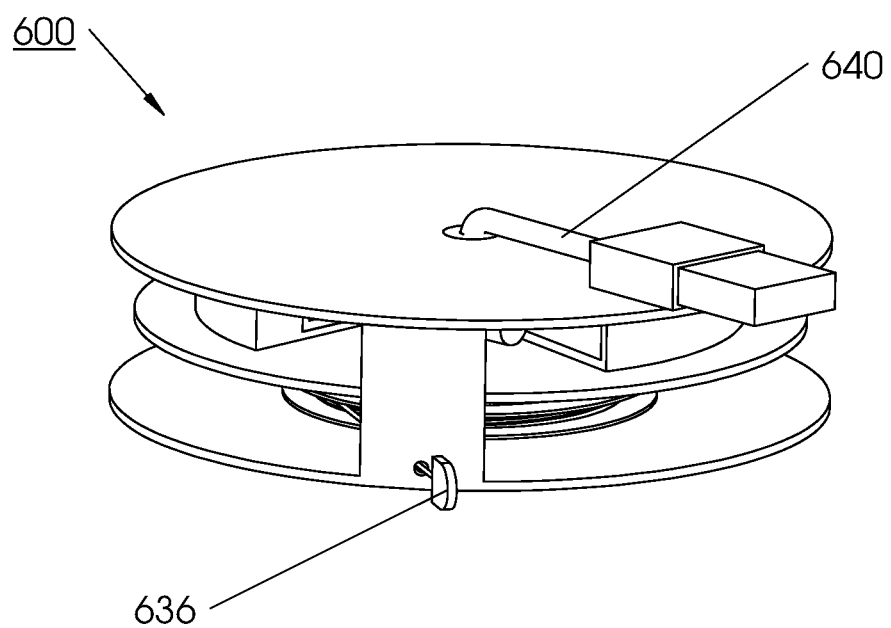
FIG. 30 is a perspective view illustrating a third embodiment of the charging cable rewind and use system, and showing its general features.
Figure 31:
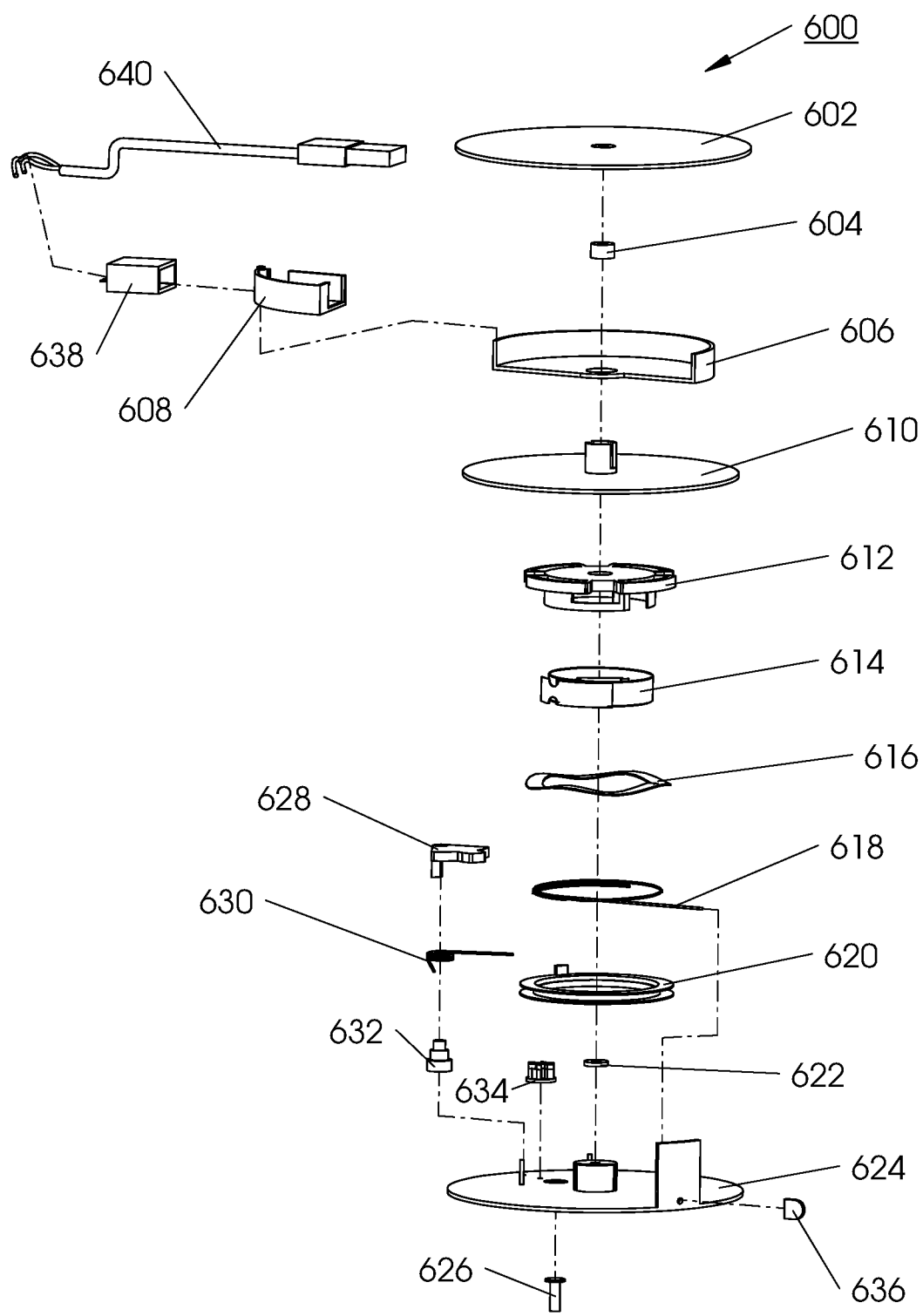
FIG. 31 is a detailed exploded perspective view illustrating the embodiment of FIG. 30 in an open position.
Figure 32:
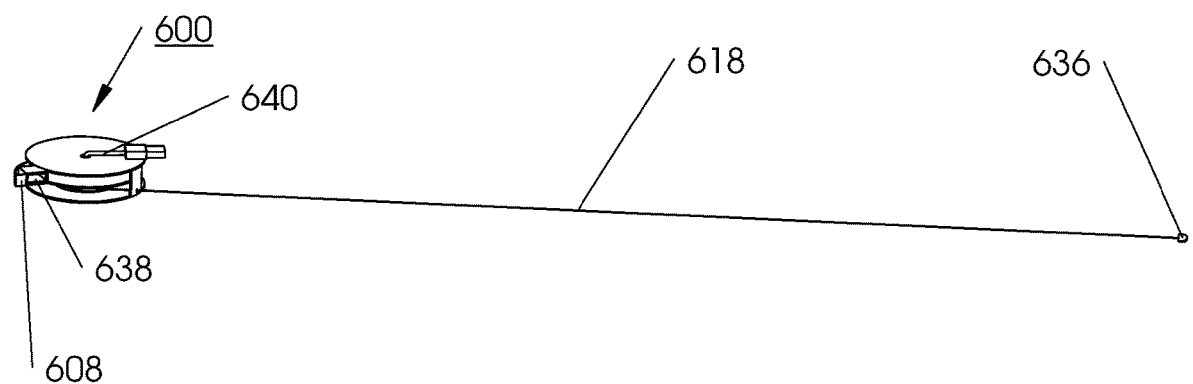
FIG. 32 is a perspective view illustrating the embodiment of FIG. 30 in a fully wound position according to the invention in operation, with the mobile broadband charging cable wound.
Figure 33:
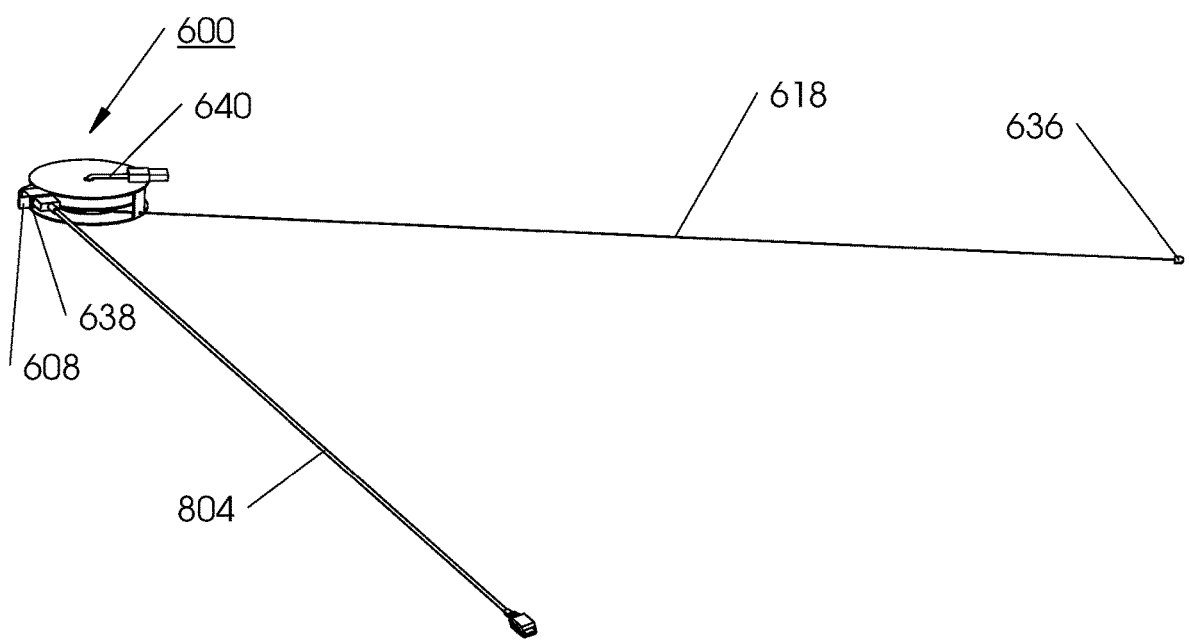
FIG. 33 is a perspective view illustrating the embodiment of FIG. 30 in an open position according to the invention in operation, with the rewind string fully extended.
Figure 34:
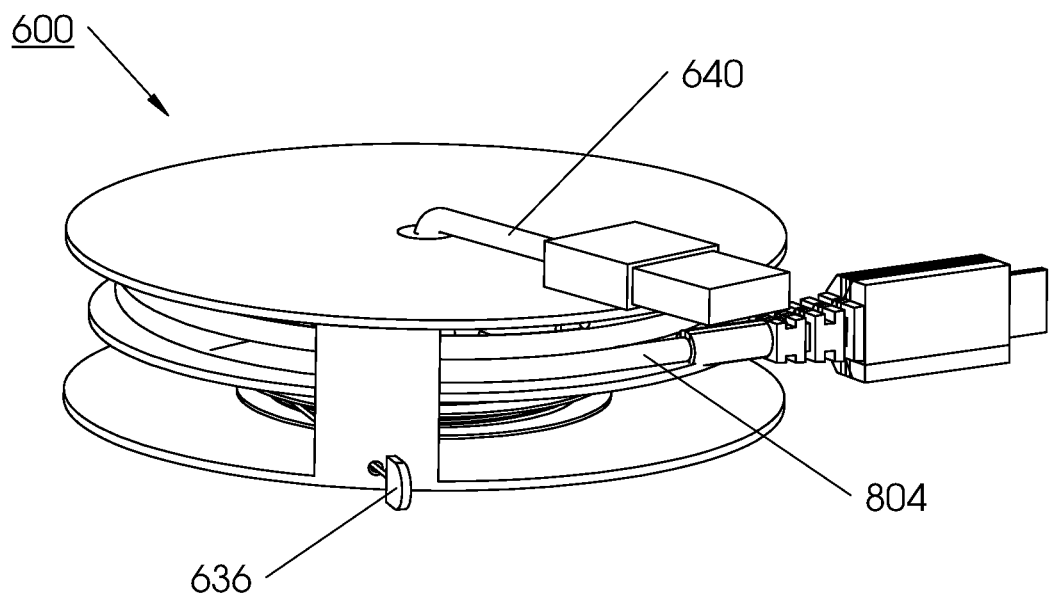
FIG. 34 is a perspective view illustrating the embodiment of FIG. 30 in an open position according to the invention in operation with the rewind string fully extended and the mobile broadband charging cable connected.

Once retracted, the USB cable 440 can be connected to an environmental power source such as a power supply distribution block 816 with a feed from a receptacle 808. The user pulls the mobile broadband device charging cable 804 to the desired length, where it locks until released for rewinding, and it can be connected to a mobile broadband device 802. To release for rewinding, a quick tug on the mobile device charging cable 804 is needed. Referring to FIG. 17, the rewind assembly 400 is depicted in use with a mobile broadband device 802. In FIG. 17 the rewind assembly 400 is being used independent of an under cabinet mobile broadband device charging and use system and the rewind assembly 400 is situated on the kitchen countertop 810.

A second embodiment of a mobile broadband device charging cable rewind and use system 500 (rewind assembly 500) of the present invention is illustrated in FIGS. 24-29. The rewind device 500 can be configured to incorporate additional connector types, such as USB Type-B, USB Type-C, USB Mini-A and Mini-B, USB Micro-A and Micro-B, D-sub, and the like. This method involves the loading of a user supplied mobile broadband device charging cable 804.

An upper spool slotted flange 502 and lower spool flange 524 are fastened together by a screw which provides for the structure of the assembly. Although in the embodiment presented in FIG. 25, the upper spool slotted flange 502 and the lower spool flange 524 are fastened together using a screw, the two spool flanges may be connected by any of several available means for fastening such as rivets, clips, chemical adhesives, and the like. Sandwiched between the upper spool slotted flange 502 and the lower spool flange 524, is a stack assembly (stack) comprising an upper slotted grommet 504, a charging cable full spool 506, a middle spool flange 510, a rewind spring housing/ratchet wheel 512, a wave disc spring 516, a string spool 520, and a lower grommet 522.

The rewind spring housing/racket wheel 512 houses a spring steel rewind 514. A rewind string 518 is wound around the string spool 520. A string pull 536 is attached to the user end of the string. A plunger 526 compresses the wave disc spring 516, engaging the string spool 220 with the rewind spring housing/ratchet wheel 512 for simultaneous rotation of the string spool 520 with the rewind spring housing/ratchet wheel 512.

On one end, the spring steel rewind 514 inserts into a slot in the rewind spring housing/ratchet wheel 512 and the other end inserts into a slot in the lower spool flange 524. The rotation of the stack winds the spring steel.

A pawl 528 is mounted on a pawl mount 532. A torsion spring 530 maintains tension of the pawl 528 for ratcheting against a star wheel 534, which allows locking of the pawl 528. The locked pawl 528 engages the teeth of the rewind spring housing/ratchet wheel 512.

The upper spool slotted flange 502 and lower spool flange 524 are joined to create a single stationary structure that supports the rotating stack. The upper slotted grommet 504 provides for rotation around the mobile broadband device charging cable 804, and accommodates the rotation of the stack on the top of the assembly. The rotation of the bottom of the stack is accommodated by the lower grommet 522.

The parts of the mobile broadband device charging cable rewind and use system 500 are preferably injection molded polymers. Other materials such as aluminum, steel, digitally printed polymers, and the like and manufacturing methods such as digital printing can be used to fabricate the parts. The rewind string 518 is small diameter with high tensile strength. Preferred materials for the rewind string include nylon, polyethylene, polyethylene coated metallic wire, and the like.

To prepare the mobile broadband device charging cable rewind and use system 500 for operation, it first must be loaded with the user's mobile broadband device charging cable 804.

A rewind assembly 500 with an upper spool flange 524 and a lower spool flange 502 each possessing a diameter of about 3 inches and with a height from the base of the lower spool flange 502 to the upper surface of the upper flange 524 of about 0.73 inches will accommodate a charging cable 804 up to 40 inches long with a diameter of 0.01 inches.

In the second rewind assembly 500 embodiment, the user pushes the plunger 526 to compress the wave disc spring 516, engaging the string spool 520 with the rewind spring housing/ratchet wheel 512 for simultaneous rotation of the string spool 520 with the rewind spring housing/ratchet wheel 512. The user pulls the string pull 536 to unwind the rewind string 518 to the desired rewind length of the mobile broadband device charging cable 804. The user aligns the slot of the upper spool slotted flange 502 and the slot of the upper slotted grommet 504. The user inserts the mobile broadband device charging cable 804 into the slot of the upper spool slotted flange 502 and the slot of the upper slotted grommet 504, leaving the desired length exiting the upper slotted grommet 504. The user releases the string pull 536, allowing for the reverse rotation of the string spool 520 and the charging cable full spool 506. The result is full retraction of the rewind string 518 and the charging cable 804. The user releases the plunger 526 to complete the loading process of the mobile broadband device charging cable rewind 500.

Once retracted, the end of the mobile broadband device charging cable 804 that exits the upper slotted grommet 504 can be connected to an environmental power source such as a power supply distribution block 816 with a feed from a receptacle 808. The user pulls the other end of the mobile broadband device charging cable 804 to the desired length, where it locks until released for rewinding, and it can be connected to a mobile broadband device 802. To release for rewinding, a quick tug on the mobile device charging cable 804 is needed.

A third embodiment of a mobile broadband device charging cable rewind and use system 600 (rewind assembly 600) of the present invention is illustrated in FIGS. 30-34. The rewind device 600 can be configured to incorporate additional connector types, such as USB Type-B, USB Type-C, USB Mini-A and Mini-B, USB Micro-A and Micro-B, D-sub, and the like. This method involves the use of a USB receptacle 638 into which a mobile broadband device charging cable 804 can be plugged. An upper spool flange 602 and lower spool flange 624 are fastened together by a screw which provides for the structure of the assembly. Although in the embodiment presented in FIG. 31, the upper spool flange 602 and the lower spool flange 624 are fastened together using a screw, the two spool flanges may be connected by any of several available means for fastening such as rivets, clips, chemical adhesives, and the like. Sandwiched between the upper spool flange 602 and the lower spool flange 624, is a stack assembly (stack) comprising an upper grommet 604, a charging cable half spool 606, a middle spool flange 610, a rewind spring housing/ratchet wheel 612, a wave disc spring 616, a string spool 620, and a lower grommet 622.

The rewind spring housing/racket wheel 612 houses a spring steel rewind 614. A rewind string 618 is wound around the string spool 620. A string pull 636 is attached to the user end of the string. A plunger 626 compresses the wave disc spring 616, engaging the string spool 620 with the rewind spring housing/ratchet wheel 612 for simultaneous rotation of the string spool 620 with the rewind spring housing/ratchet wheel 612.

On one end, the spring steel rewind 614 inserts into a slot in the rewind spring housing/ratchet wheel 612 and the other end inserts into a slot in the lower spool flange 624. The rotation of the stack winds the spring steel.

A pawl 628 is mounted on a pawl mount 632. A torsion spring 630 maintains tension of the pawl 628 for ratcheting against a star wheel 634, which allows locking of the pawl 628. The locked pawl 628 engages the teeth of the rewind spring housing/ratchet wheel 612.

The USB receptacle 638 is integral to a charging cable spool pivoting section 608, which pivots from the charging cable half spool 606 for plugging of the mobile broadband device charging cable 804.

Wired to the back of the USB receptacle 638 is a USB cable 640 that exits the upper grommet 604 and is rigidly attached to the upper spool flange 602, with the connector protruding slightly beyond the outer circumference for connection to an environmental power source.

The upper spool flange 602 and lower spool flange 624 are joined to create a single stationary structure that supports the rotating stack. The upper grommet 204 provides for rotation around the USB cable 640, and accommodates the rotation of the stack on the top of the assembly. The rotation of the bottom of the stack is accommodated by the lower grommet 622.

The parts of the mobile broadband device charging cable rewind and use system 600 are preferably injection molded. Other materials and manufacturing methods can be used to fabricate the parts. The rewind string 618 is small diameter with high tensile strength. Preferred materials for the rewind string include nylon, polyethylene, polyethylene coated metallic wire, and the like.

To prepare the mobile broadband device charging cable rewind and use system 600 for operation, it first must be loaded with the user's mobile broadband device charging cable 804.

A rewind assembly 600 with an upper spool flange 624 and a lower spool flange 602 each possessing a diameter of about 3 inches and with a height from the base of the lower spool flange 602 to the upper surface of the upper flange 624 of about 0.73 inches will accommodate a charging cable 804 up to 40 inches long with a diameter of 0.01 inches.

In the third rewind device 600 embodiment, the user pushes the plunger 626 to compress the wave disc spring 616, engaging the string spool 620 with the rewind spring housing/ratchet wheel 612 for simultaneous rotation of the string spool 620 with the rewind spring housing/ratchet wheel 612. The user pulls the string pull 636 to unwind the rewind string 618 to the desired rewind length of the mobile broadband device charging cable 804. The hinged charging cable spool pivoting section 608 swings from the charging cable half spool 606 exposing the USB receptacle 638 into which is plugged the mobile broadband device charging cable 804. After closing the charging cable spool pivoting section 608, the user releases the string pull 636, allowing for the reverse rotation of the string spool 620, the charging cable half spool 606, and the charging cable spool pivoting section 608. The result is full retraction of the rewind string 618 and the charging cable 804. The user releases the plunger 626 to complete the loading process of the mobile broadband device charging cable rewind 600.

Once retracted, the USB cable 240 can be connected to an environmental power source such as a power supply distribution block 816 with a feed from a receptacle 808. The user pulls the mobile broadband device charging cable 804 to the desired length, where it locks until released for rewinding, and it can be connected to a mobile broadband device 802. To release for rewinding, a quick tug on the mobile device charging cable 804 is needed. Because the USB cable 640 is rigidly attached to the upper spool flange 602, the mobile broadband device charging cable rewind and use system 600 is solidly supported by the environmental power source.

In another preferred embodiment not depicted the rewind device possesses a handle which may be used to manually rotate the spools. As those skilled in the art are aware, the handle may be provided in a fixed position or may be levered such that the handle may be rotated 90 degrees to set against the rewind device when the handle is not in use.

In yet another preferred embodiment, the rewind device may possess a small motor which may be mounted to the spools through readily available means to allow for the winding and unwinding of the spools.

In another embodiment, not depicted, the rewind device may be configured to use and rewind for storage purposes other materials with coilability such as tubes, hoses, chain, wire, and the like.

In another embodiment of the present invention, the rewind assembly 500 is loaded with any one of many consumer electronic device cables such as an earbud cable fitted with a 3.5 mm TRRS or TRRRS phone connector. Exercise enthusiasts could use the device to prevent their device cables from interfering with their physical activity. The felicitous loading of the cable allows device use while eliminating cord entanglement. In yet another embodiment of the present invention, the rewind assembly can be used with consumer electronic device cables such as stereo headphone plugs such as 3.5 mm TRRS and TRRRS. A user winds the cable around the rewind assembly as in the embodiments depicted in FIGS. 16-34. The user will use the rewind string to load an appropriate length of cable for unwinding from the rewind assembly. This will allow for the accommodation of various lengths of required cable for usage of the desired device. For example a jogger could use earbuds and a smartphone to listen to music or an audio book, and could leave the phone securely in a pocket and choose the correct length of speaker cable to allow for the earbuds to fit comfortably in the user's ears while only allowing as much cable to be deployed as is necessary to keep from creating a snagging hazard such as having the cable catch on the user's limbs while jogging.

Figure 35:
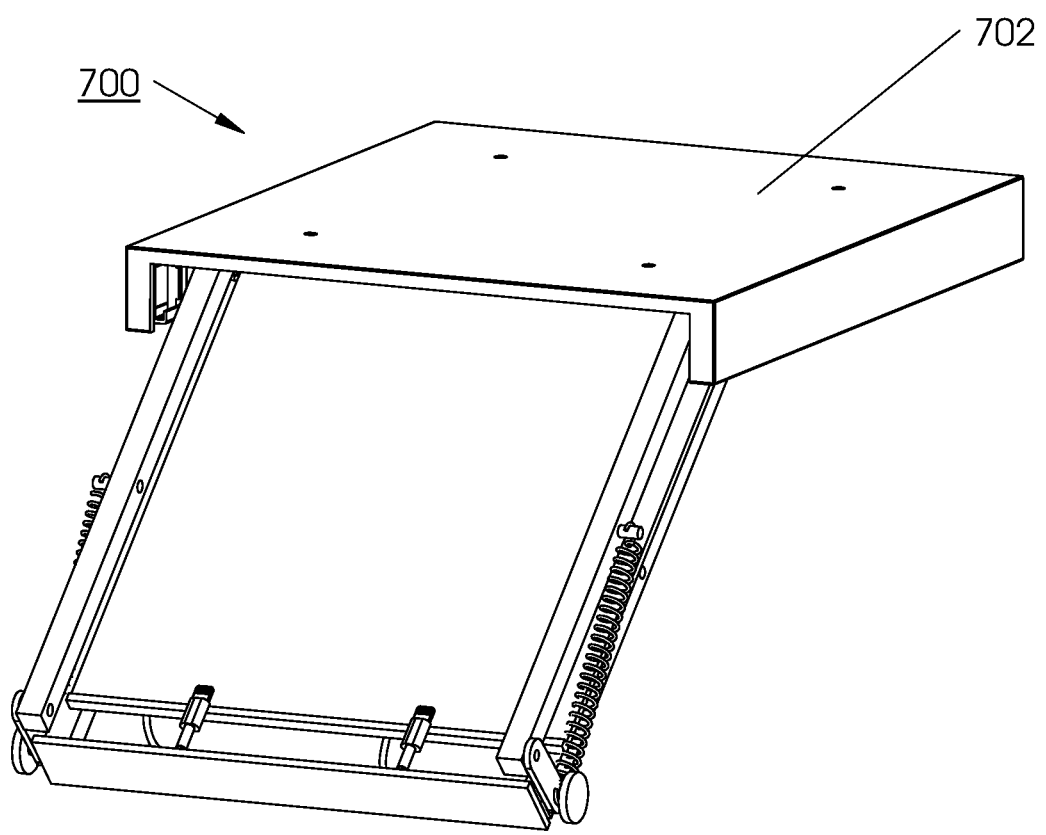
FIG. 35 is an environmental perspective view illustrating the charging and use system of FIG. 4 showing its general features including a cutout of the front face of the system housing.

Referring to the embodiment of the present invention depicted in FIG. 35, a preferred under cabinet mobile broadband device charging and use system 700 (charging and use system 700), the charging and use system 700 is identical to the charging and use system 100 from FIG. 4 with the exception that there is a cutout to the front face of the system housing 702 relative to that of the system housing 102. This cutout would allow for usage of the system in spaces where there is little room to extend the two shelves of the charging and usage system 700.

Although several embodiments of the present invention, methods to use said, and its advantages have been described in detail, it should be understood that various changes, substitutions, and alterations can be made herein without departing from the spirit and scope of the invention as defined by the appended claims. The various embodiments used to describe the principles of the present invention are by way of illustration only and should not be construed in any way to limit the scope of the invention. Those skilled in the art will understand that the principles of the present invention may be implemented in any suitably arranged device.

I claim:

1. A usage and power charging system for at least one mobile broadband device each having a power cord for maintaining neatness of the at least one mobile broadband device power cord comprising a system housing possessing inner parallel surfaces wherein said housing is capable of being opened and closed; means for mounting said housing to the lower surface of a shelving; an upper shelf possessing an upper shelf front, said upper shelf front possessing an edge; a lower shelf possessing a lower shelf front, said lower shelf front possessing an edge; a system power cable rewind; means for attenuating said lower shelf and said upper shelf while said housing is opened or closed; a power supply distribution block; at least one cable rewind assembly; wherein said cable rewind is mounted to said lower shelf; means for supplying power from the multiport power supply distribution block to the at least one mobile broadband device; wherein the at least one power cord is connected to the power supply distribution block on one end and connected to the mobile broadband device on the other end; wherein the cable rewind further maintains tension on the means for supplying power from the multiport power supply distribution block to the at least one mobile broadband device while the housing is opened or closed; and wherein the at least one mobile broadband device is visually accessible to a user while said housing is opened.

2. The usage and power charging system of claim 1 wherein the means for supplying power from the power supply distribution block to the mobile broadband device is an electrical charging cord mounted to said cable rewind; wherein the electrical charging cord is connected to the power supply distribution block on one end and connected to the mobile broadband device on the other end.

3. The usage and power charging system for mobile broadband devices of claim 2 wherein the cable rewind assembly comprises an upper spool flange and a lower spool flange, a stack, and a screw, wherein the upper spool flange and the lower spool flange are fastened together via the screw; said cable rewind assembly provides means for winding a cable to an appropriate length to allow for the minimal length of unwound cable to power said mobile broadband devices.

4. The usage and power charging system of claim 3 wherein the power supply distribution block is a multiport universal serial bus hub.

5. The usage and power charging system of claim 3 wherein the stack comprises an upper grommet, a charging cable half spool, a middle spool flange, a rewind spring housing further comprising a ratchet wheel, a wave disc spring, a string, a string spool, a lower grommet wherein the rewind spring housing further comprises a spring steel rewind and a rewind string, a string pull, a plunger, a pawl, a pawl mount, a star wheel, a torsion mount, a universal service bus receptacle, and a universal serial bus cable; said string is wound around the string spool; the rewind spring housing houses the spring steel rewind; the rewind string is wound around the string spool; the string pull is attached to the user end of the string; wherein the plunger compresses the wave disc spring, engaging the string spool with the rewind spring housing allowing for simultaneous rotation of the string spool with the rewind spring housing; wherein the pawl is mounted on the pawl mount and the torsion spring maintains tension on the pawl for ratcheting against the star wheel, allowing locking of the pawl; wherein the locked pawl engages the teeth of the rewind spring housing ratchet wheel; wherein the mobile broadband device charging cords are plugged into said universal serial bus receptacle; wherein the universal serial bus cable is connected on one end to the back of the universal serial bus receptacle and is connected on the other end to an environmental power source; said universal serial bus cable exiting through the upper grommet; said lower grommet accommodating rotation of the bottom of the stack.

6. The usage and power charging system of claim 5 wherein said means for attenuating said lower shelf and said upper shelf comprise a pair of sleeve bearing guide rails; a pair of sleeve bearing carriages; a pair of carriage spacers; four support arms each possessing a first end, a second end, and a midsection; a pivot arm; two support brackets; at least one rewind pin; a tightening knob; and a spring wherein each sleeve bearing guiderail is mounted on said inner parallel surfaces of the system housing; each sleeve bearing carriage is mounted to the each sleeve bearing guiderail; the first end of each pivot arm is connected to the sleeve bearing guiderail, the second end of each pivot arm is connected to the upper shelf, and the midsection of each pivot arm is connected to the lower shelf, wherein the pivot arms are arranged into two pairs; each pair of pivot arms is connected to the support arm pivot bracket; said upper shelf front edge allowing for the mobile broadband devices to rest against the upper shelf front; wherein the at least one rewind pin is mounted to the lower shelf; and the tightening knob and spring are mounted to the lower shelf; wherein the cable rewind further maintains tension on the electrical charging cord while the sleeve bearing carriage slides along the sleeve bearing guiderail.

7. The usage and power system of claim 6 wherein said means for mounting the housing are chosen from the group of mounting holes; bolting; taping; adhesive; Velcro; brackets; and an adhesive which the user may mount, unmount and then remount.

8. The usage and power system of claim 7 wherein said housing is comprised of injection molded plastic, wood, acrylonitrile butadiene styrene, aluminum, plywood, metal, polymers, or environmentally friendly materials.

9. The usage and power system of claim 7 wherein said upper shelf is comprised of injection molded plastic, wood, acrylonitrile butadiene styrene, aluminum, plywood, metal, polymers, or environmentally friendly materials and said lower shelf is comprised of injection molded plastic, wood, acrylonitrile butadiene styrene, aluminum, plywood, metal, polymers, or environmentally friendly materials.

10. The usage and power system of claim 6 wherein the system housing is about 1.25 inches high, about 10.375 inches long, and about 9.5 inches wide.

11. The usage and power system of claim 10 wherein the lower shelf is about 0.040 inches thick, about 8 inches long, and about 8 inches wide and the upper shelf is about 0.040 inches thick, about 8 inches long, and about 8 inches wide.

12. The usage and power system of claim 6 wherein the means for mounting is a reusable adhesive.

13. The usage and power charging system of claim 1 wherein the means for supplying power from the power supply distribution block to the mobile broadband device is a wireless charger cable and a wireless charger; wherein said wireless charger cable is mounted to said cable rewind; wherein the wireless charger cable is connected to the power supply distribution block on one end and connected to the wireless charger on the other end; said mobile broadband device resting upon the upper surface of said wireless charger.

14. The usage and power charging system of claim 1 wherein the means for supplying power from the power supply distribution block to the mobile broadband device comprises a charging bar, a removable/pivoting tip, and a USB to USB cable, wherein USB to USB cable connects on one end to the power supply distribution block and connects on the other end to the charging bar, the charging bar is mounted to the upper shelf, the removable/pivoting tip is inserted into the charging bar, and the mobile broadband device connects to the removable/pivoting tip.

15. A cable rewind assembly for usage with mobile broadband devices comprising an upper spool flange and a lower spool flange, a stack, a steel spring rewind, and a screw, wherein the upper spool flange and the lower spool flange are fastened together via the screw; said cable rewind assembly provides means for initial winding of a cable and unwinding the cable to an appropriate length to allow for the minimal length of unwound cable to power, charge, or both power and charge said mobile broadband devices during their normal course of operation, said means further providing means for rewinding said cable back upon said stack upon completion of said normal course of operation; wherein said means for rewinding the cable includes the spring steel rewind.

16. The cable rewind assembly of claim 15 further comprising a string wherein the upper spool flange and the lower spool flange are fastened together via the screw; said cable rewind assembly provides means for initial winding of a cable and unwinding the cable to an appropriate length to allow for the minimal length of unwound cable to power, charge, or both power and charge said mobile broadband devices during their normal course of operation, said means further providing means for rewinding said cable back upon said stack upon completion of said normal course of operation; wherein said means for initial winding of the cable includes the string and wherein said means for rewinding the cable includes the spring steel rewind.

17. The cable rewind assembly of claim 16 further comprising an upper spool flange and a lower spool flange, and a screw, wherein the upper spool flange and the lower spool flange are fastened together via the screw; said cable rewind assembly further comprises a stack, wherein said stack comprises an upper grommet, a charging cable half spool, a middle spool flange, a rewind spring housing further comprising a ratchet wheel, a wave disc spring, a string, a string spool, a lower grommet wherein the rewind spring housing further comprises a spring steel rewind and a rewind string, a string pull, a plunger, a pawl, a pawl mount, a star wheel, a torsion mount, a universal service bus receptacle, and a universal serial bus cable; said string is wound around the string spool; the rewind spring housing houses the spring steel rewind; the rewind string is wound around the string spool; the string pull is attached to the user end of the string; wherein the plunger compresses the wave disc spring, engaging the string spool with the rewind spring housing allowing for simultaneous rotation of the string spool with the rewind spring housing; wherein the pawl is mounted on the pawl mount and the torsion spring maintains tension on the pawl for ratcheting against the star wheel, allowing locking of the pawl; wherein the locked pawl engages the teeth of the rewind spring housing ratchet wheel; wherein the mobile broadband device charging cords are plugged into said universal serial bus receptacle; wherein the universal serial bus cable is connected on one end to the back of the universal serial bus receptacle and is connected on the other end to an environmental power source; said universal serial bus cable exiting through the upper grommet; said lower grommet accommodating rotation of the bottom of the stack.

18. The cable rewind assembly of claim 17 wherein the upper spool flange is about 3 inches in diameter and the lower spool flange is about 3 inches in diameter and the height of the cable rewind assembly is about 0.73 inches thick.

19. The cable rewind assembly of claim 17 wherein said universal serial bus cable exits through the side of the upper spool flange.

20. A cord rewind assembly comprising an upper spool flange and a lower spool flange, a stack, a screw, and a spring steel rewind, wherein the upper spool flange and the lower spool flange are fastened together via the screw; said cord rewind assembly provides means for winding of a cord, and means for unwinding and locking the cord to a user chosen length, and further providing means for rewinding said cord as desired; wherein said means for rewinding the cord includes the spring steel rewind.

21. The cord rewind assembly of claim 20 further comprising a string, wherein said cord rewind assembly provides means for initial winding of a cord, and unwinding and locking the cord to a user chosen length wherein said means for initial winding of the cord includes the string, and further providing means for rewinding said cord as desired; wherein said means for rewinding the cord includes the spring steel rewind.

22. The cord rewind assembly of claim 21 further comprising an upper spool flange and a lower spool flange, and a screw, wherein the upper spool flange and the lower spool flange are fastened together via the screw; said cord rewind assembly further comprises a stack, wherein said stack comprises an upper grommet, a charging cable half spool, a middle spool flange, a rewind spring housing further comprising a ratchet wheel, a wave disc spring, a string, a string spool, a lower grommet wherein the rewind spring housing further comprises a spring steel rewind and a rewind string, a string pull, a plunger, a pawl, a pawl mount, a star wheel, a torsion mount, a universal service bus receptacle, and a universal serial bus cable; said string is wound around the string spool; the rewind spring housing houses the spring steel rewind; the rewind string is wound around the string spool; the string pull is attached to the user end of the string; wherein the plunger compresses the wave disc spring, engaging the string spool with the rewind spring housing allowing for simultaneous rotation of the string spool with the rewind spring housing; wherein the pawl is mounted on the pawl mount and the torsion spring maintains tension on the pawl for ratcheting against the star wheel, allowing locking of the pawl; wherein the locked pawl engages the teeth of the rewind spring housing ratchet wheel; wherein the mobile broadband device charging cords are plugged into said universal serial bus receptacle; wherein the universal serial bus cable is connected on one end to the back of the universal serial bus receptacle and is connected on the other end to the environmental power source; said universal serial bus cable exiting through the upper grommet; said lower grommet accommodating rotation of the bottom of the stack.

* * * * *